(12) United States Patent
Hayashi et al.

(10) Patent No.: US 12,316,604 B2
(45) Date of Patent: May 27, 2025

(54) REGISTRATION SYSTEM, REGISTRATION METHOD, AND REGISTRATION PROGRAM

(71) Applicant: Nippon Telegraph and Telephone Corporation, Tokyo (JP)

(72) Inventors: Yuhei Hayashi, Musashino (JP); Hiroshi Suzuki, Musashino (JP); Ichiro Kudo, Musashino (JP); Hiroshi Osawa, Musashino (JP); Yuki Miyoshi, Musashino (JP); Takeaki Nishioka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 394 days.

(21) Appl. No.: 17/602,033

(22) PCT Filed: Mar. 26, 2020

(86) PCT No.: PCT/JP2020/013678
§ 371 (c)(1),
(2) Date: Oct. 7, 2021

(87) PCT Pub. No.: WO2020/209085
PCT Pub. Date: Oct. 15, 2020

(65) Prior Publication Data
US 2022/0182361 A1    Jun. 9, 2022

(30) Foreign Application Priority Data
Apr. 9, 2019    (JP) .................................. 2019-074324

(51) Int. Cl.
*H04L 9/40*    (2022.01)
*H04L 43/022*    (2022.01)
(Continued)

(52) U.S. Cl.
CPC ........ *H04L 63/0236* (2013.01); *H04L 43/022* (2013.01); *H04L 43/028* (2013.01);
(Continued)

(58) Field of Classification Search
CPC . H04L 43/022; H04L 43/028; H04L 43/0829; H04L 43/0894; H04L 63/0236; H04L 63/1458; H04L 63/22
See application file for complete search history.

(56) References Cited

U.S. PATENT DOCUMENTS 8,160,089 B1 *  4/2012  Padiyar ................. H04L 12/413
                                                  370/445
9,398,043 B1 *  7/2016  Yang .................... H04L 63/1441
(Continued)

OTHER PUBLICATIONS

Iqbal, et al. "Dynamic Core Allocation and Packet Scheduling in Multicore Network Processors", IEEE Transactions on Computers, vol. 65, Issue 12, pp. 3646-3660, Dec. 1, 2016. (Year: 2016).*
(Continued)

*Primary Examiner* — Thomas J Dailey
(74) *Attorney, Agent, or Firm* — Fish & Richardson P.C.

(57) ABSTRACT

A registration device (10) includes an extracting unit (131) that extracts inner header information and outer header information of an encapsulated packet, a filter unit (132) that calculates a hash value of the inner header information and the outer header information as an address of a hash table in which arrival information indicating whether a first packet of a series of flow has arrived is registered for each address and causes, based on the hash table, inner header information and outer header information of the first packet of the series of flow to pass, and a registering unit (133) that registers the inner header information and the outer header information of the first packet, which the filter unit (132) has caused to pass, in a database in association with each other.

18 Claims, 47 Drawing Sheets

(51) Int. Cl.
*H04L 43/028* (2022.01)
*H04L 43/0829* (2022.01)
*H04L 43/0894* (2022.01)
*H04L 69/22* (2022.01)

(52) U.S. Cl.
CPC ...... *H04L 43/0829* (2013.01); *H04L 43/0894* (2013.01); *H04L 63/1458* (2013.01); *H04L 69/22* (2013.01)

(56) References Cited

U.S. PATENT DOCUMENTS

| | | | | |
|---|---|---|---|---|
| 9,674,088 | B1* | 6/2017 | Sivaramakrishnan | ........................ H04L 45/586 |
| 9,847,940 | B2* | 12/2017 | Hyoudou | ................ H04L 12/54 |
| 11,637,767 | B2* | 4/2023 | Shimizu | ................ H04L 45/22 370/392 |
| 11,811,902 | B2* | 11/2023 | Bosshart | ................ H04L 45/38 |
| 2014/0241247 | A1* | 8/2014 | Kempf | ................ H04W 76/12 370/328 |
| 2014/0304352 | A1* | 10/2014 | Chaudhary | ......... H04L 67/1029 709/208 |
| 2015/0244617 | A1* | 8/2015 | Nakil | ................ H04L 41/0895 709/224 |
| 2016/0142315 | A1* | 5/2016 | Tomonaga | .......... H04L 45/7453 370/392 |
| 2017/0359238 | A1* | 12/2017 | Hughes | ................ H04L 43/067 |

OTHER PUBLICATIONS

Ixia, "Vision One, an all-in-one tool that provides high performance and lossless visualization," retrieved on Mar. 22, 2019, retrieved from URL <https://www.ixiacom.com/ja/products/vision-one>, 9 pages (with English translation).

Ixia, "Vision One: security without sacrifice," Ixia Data Sheet, retrieved on Mar. 22, 2019, retrieved from URL <https://www.ixiacom.com/sites/default/files/2017-07/915-6691-01-V-DS-Vision-ONE.pdf>, 11 pages.

\* cited by examiner

Fig. 2

| No | LOGICAL NAME | PHYSICAL NAME | DATA TYPE | REMARKS |
|---|---|---|---|---|
| 1 | SERIAL NUMBER | id | bigint | |
| 2 | RECEPTION DATE | rcv_date | date | PACKET RECEPTION DATE |
| 3 | RECEPTION TIME | rcv_time | time | PACKET RECEPTION TIME |
| 4 | Inner SOURCE IP ADDRESS | inner_src_ip | inet | SOURCE IP ADDRESS ON INNER SIDE OF CAPSULE |
| 5 | Inner SOURCE PORT NUMBER | inner_src_port | int | SOURCE PORT NUMBER ON INNER SIDE OF CAPSULE |
| 6 | Inner DESTINATION IP ADDRESS | inner_dst_ip | inet | DESTINATION IP ADDRESS ON INNER SIDE OF CAPSULE |
| 7 | Inner DESTINATION PORT NUMBER | inner_dst_port | int | DESTINATION PORT NUMBER ON OUTER SIDE OF CAPSULE |
| 8 | Outer SOURCE IP ADDRESS | outer_src_ip | inet | SOURCE IP ADDRESS ON OUTER SIDE OF CAPSULE |
| 9 | Outer DESTINATION IP ADDRESS | outer_dst_ip | inet | DESTINATION IP ADDRESS ON OUTER SIDE OF CAPSULE |
| 10 | UPDATE DATE AND TIME | import_time | timestamp | |

| ADDRESS | ARRIVAL FLAG 0: NOT ARRIVED 1: ARRIVED | TIMER |
|---|---|---|
| 0x0000 | 1 | 1110 |
| 0x0001 | 0 | 1111 |
| 0x0002 | 0 | 1111 |
| 0x0003 | 1 | 1110 |
| 0x0004 | 0 | 1111 |
| 0x0005 | 0 | 1111 |
| 0x0006 | 0 | 1111 |
| 0x0007 | 1 | 0000 |
| 0x0008 | 0 | 1111 |
| ... | | |
| 0x1111 | 0 | 1111 |

(1) CHANGE 1 TO 0

* DEFAULT VALUE
· TIMER: ALL 1
· ARRIVAL FLAG: 0

Fig. 18

| ADDRESS | TIMEOUT TIME |
|---------|--------------|
| 0x0000 | 0000-00-00 00:00:00 |
| 0x0001 | 0000-00-00 00:00:00 |
| 0x0002 | 0000-00-00 00:00:00 |
| 0x0003 | 2018-06-08 14:35:21 |
| 0x0004 | 0000-00-00 00:00:00 |
| 0x0005 | 0000-00-00 00:00:00 |
| 0x0006 | 0000-00-00 00:00:00 |
| 0x0007 | 2018-06-05 09:25:01 |
| 0x0008 | 0000-00-00 00:00:00 |
| ... | |
| 0x1111 | 0000-00-00 00:00:00 |

1322A (1) CHANGE 2018-06-05 09:25:01 TO 0000-00-00 00:00:00

\* DEFAULT VALUE
· ARRIVAL TIME: 0000-00-00 00:00:00

Fig. 27

(1) CHANGE 1 TO 0

(2) CHANGE 0000 TO 1111

1322B

| ADDRESS | ARRIVAL FLAG 0: NOT ARRIVED 1: ARRIVED | TIMER | DETECTION bit |
|---|---|---|---|
| 0x0000 | 0 | 1111 | 000 |
| 0x0001 | 0 | 1111 | 000 |
| 0x0002 | 0 | 1111 | 000 |
| 0x0003 | 1 | 1000 | 101 |
| 0x0004 | 0 | 1111 | 000 |
| 0x0005 | 0 | 1111 | 000 |
| 0x0006 | 0 | 1111 | 000 |
| 0x0007 | 1 | 0000 | 110 |
| 0x0008 | 0 | 1111 | 000 |
| ... | | | |
| 0x1111 | 0 | 1111 | 000 |

(3) CHANGE 110 TO 000

\* DEFAULT VALUE
· TIMER: ALL 1
· ARRIVAL FLAG: 0

REGISTRATION SYSTEM, REGISTRATION METHOD, AND REGISTRATION PROGRAM

CROSS-REFERENCE TO RELATED APPLICATIONS

This application is a National Stage application under 35 U.S.C. § 371 of International Application No. PCT/JP2020/013678, having an International Filing Date of Mar. 26, 2020, which claims priority to Japanese Application Serial No. 2019-074324, filed on Apr. 9, 2019. The disclosure of the prior application is considered part of the disclosure of this application, and is incorporated in its entirety into this application.

TECHNICAL FIELD

The present invention relates to a registration system, a registration method, and a registration program.

BACKGROUND ART

In recent years, DDoS attacks have been increasing with the spread of the Internet. As an analysis tool for such attacks, analysis tools such as a Mitigation device, an IDS (Intrusion Detection System), and a WAF (Web Application Firewall) are used.

Incidentally, in order to analyze a tunneling packet, that is, an encapsulated packet, it has been necessary to perform an analysis after deleting an outer header. In order to perform control of a filter, band limitation, and the like in a network based on an analysis result, it has been necessary to retrieve an original outer header from an inner header. Accordingly, it is necessary to associate an inner header and an outer header of a packet with each other.

CITATION LIST

Non-Patent Literature

Non-Patent Literature 1: Ixia, "Vision ONE", [searched on Mar. 22, 2019], Internet <URL: https://www.ixiacom.com/ja/products/vision-one>

Non-Patent Literature 2: Ixia, "Vision ONE DATA SHEET", [searched on Mar. 22, 2019], Internet <URL: https://www.ixiacom.com/sites/default/files/2017-07/915-6691-01-V-DS-Vision-ONE.pdf>

SUMMARY OF THE INVENTION

Technical Problem

However, conventionally, after an inner header and an outer header are extracted from an encapsulated packet, inner headers and outpour headers are registered in a database (DB) in association with each other about all packets. Accordingly, in the conventional method, there is a problem in that a processing load of the DB registration is high and an increase in speed of processing is difficult. Conventionally, all associations of the DB are accessed and original outer header information is retrieved from inner header information. Therefore, a load for the access to the DB is also high.

The present invention has been made in view of the above, and an object of the present invention is to provide a registration system, a registration method, and a registration program that enable an increase in speed of registration processing of an encapsulated packet in a DB of an association relation between an inner header and an outer header of an encapsulated packet.

Means for Solving the Problem

In order to solve the problems described above and achieve the object, a registration device according to the present invention includes: an extracting unit that extracts inner header information and outer header information of an encapsulated packet; a filter unit that calculates a hash value of the inner header information and the outer header information as an address of an address table in which arrival information indicating whether a first packet of a series of flow has arrived is registered for each address and causes, based on the hash table, inner header information and outer header information of the first packet of the series of flow to pass; and a registering unit that registers the inner header information and the outer header information of the first packet, which the filter unit has caused to pass, in a database in association with each other.

Effects of the Invention

The present invention enables an increase in speed of registration processing for registering an association relation between an inner header and an outer header of an encapsulated packet in a DB.

BRIEF DESCRIPTION OF DRAWINGS

FIG. 2 is a diagram showing a registered information example of a DB shown in FIG. 1.

FIG. 10 is a diagram for explaining entry refresh for a hash table shown in FIG. 6.

FIG. 18 is a diagram for explaining entry refresh for a hash table shown in FIG. 15.

FIG. 27 is a diagram for explaining entry refresh for a hash table shown in FIG. 22.

DESCRIPTION OF EMBODIMENTS

Figure 1:
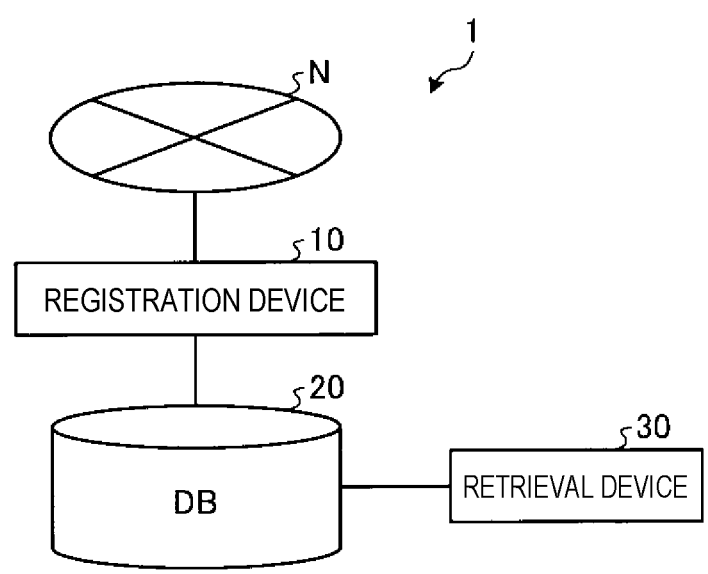
FIG. 1 is a diagram showing an example of the configuration of a communication system according to a first embodiment.

Embodiments of the present invention are explained in detail below with reference to the drawings. Note that the present invention is not limited by the embodiments. In descriptions in the drawings, the same portions are denoted by the same reference numerals and signs.

First Embodiment

[Overview of a Communication System]

First, the configuration of a communication system according to a first embodiment is explained with reference to FIG. 1. FIG. 1 is a diagram showing an example of the configuration of the communication system according to the embodiment.

As shown in FIG. 1, a communication system 1 includes a network N, a registration device 10, a DB 20, and a retrieval device 30. The communication system 1 is a network internal system that performs tunneling in a process of transfer of a packet.

The registration device 10 receives an input of a tunnel traffic flow via the network N. The registration device 10 extracts inner header information and outer header information of an encapsulated packet and registers the inner header information and the outpour header information of the packet in the DB 20 in association with each other. The registration device 10 registers inner header information and outer header information of a first packet of a series of flow in the DB 20.

In the DB 20, the inner header information and the outer header information of the packet are registered in association with each other. The DB 20 enables retrieval of the outer header information from the inner header information or retrieval of the inner header information from the outer header information.

FIG. 2 is a diagram showing a registered information example of the DB 20 shown in FIG. 1. As shown in FIG. 2, the DB 20 registers time information and a 5-tuple of an inner header and a 5-tuple of an outer header in association with each other. Specifically, the DB 20 registers, as association information of one set of inner header information and outer header information, data including a serial number given to a packet, a reception date and time of the packet, inner header information including an inner source IP address of the packet and the like, outer header information including an outer source IP address of the packet and the like, and an update data and time of the packet.

The retrieval device 30 accesses the DB 20 and retrieves the inner header information or the outer header information of the packet. The retrieval device 30 accesses the DB 20 and retrieves the outer header information from the inner header information. Alternatively, the retrieval device 30 accesses the DB 20 and enables retrieval of the inner header information from the outer header information.

An example in which the retrieval device 30 retrieves the outer header information from the inner header information is explained. For example, when a header-stripped packet is analyzed by a security device or the like and a result of the analysis includes only the inner header information, it is necessary to retrieve the outer header information from the inner header information when it is desired to perform some control on a network based on the analysis result. In such a case, the retrieval device 30 accesses the DB 20, retrieves the outer header information from the inner header information, and transmits a retrieval result to a control device.

[Configuration of the Registration Device]

Figure 3:
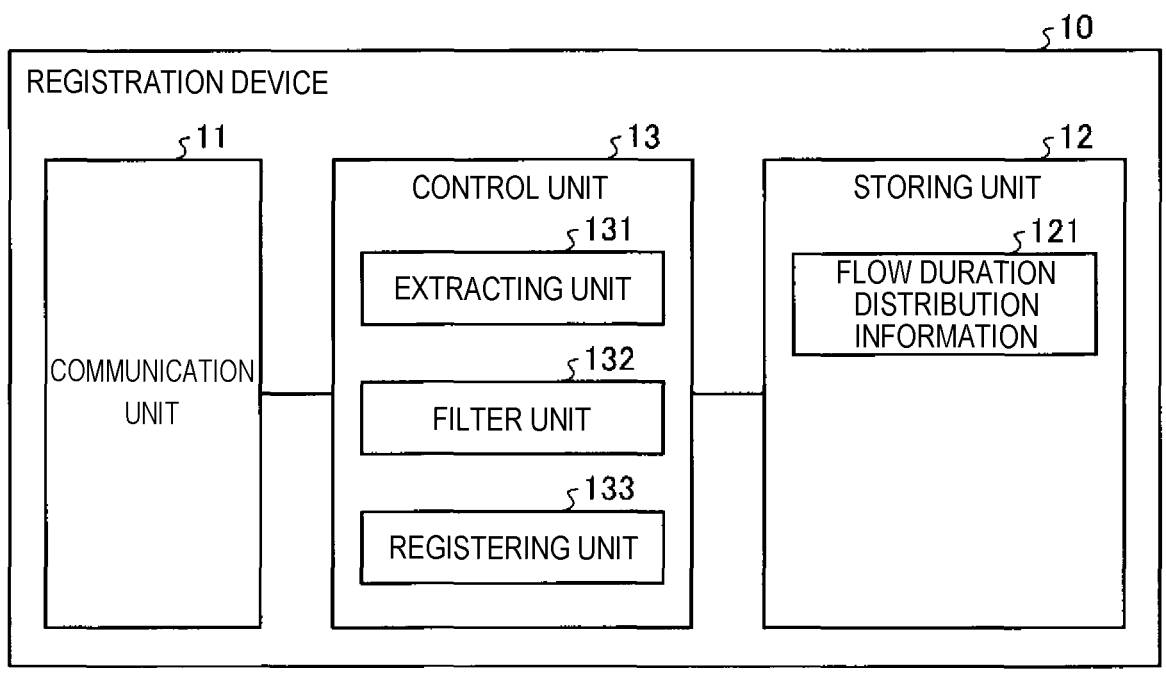
FIG. 3 is a diagram showing an example of the configuration of a registration device shown in FIG. 1.

The configuration of the registration device 10 shown in FIG. 1 is explained. FIG. 3 is a diagram showing an example of the configuration of the registration device 10 shown in FIG. 1. As shown in FIG. 3, the registration device 10 includes a communication unit 11, a storing unit 12, and a control unit 13.

The communication unit 11 is a communication interface that transmits and receives various kinds of information between the communication interface and other devices connected via a network or the like. The communication unit 11 is realized by an NIC (Network Interface Card) or the like and performs communication between other devices and the control unit 13 (explained below) via an electric communication line such as a LAN (Local Area Network) or the Internet. For example, the communication unit 11 receives an input of a tunnel traffic flow via the network N.

The storing unit 12 is a storage device such as a HDD (Hard Disk Drive), an SSD (Solid State Drive), or an optical device. Note that the storing unit 12 may be a semiconductor memory capable of rewriting data such as a RAM (Random Access Memory), a flash memory, or an NVSRAM (Non Volatile Static Random Access Memory). The storing unit 12 stores an OS (Operating System) and various programs to be executed by the registration device 10. Further, the storing unit 12 stores various kinds of information used in the execution of the programs.

The storing unit 12 stores flow duration distribution information 121. The flow duration distribution information 121 is information indicating a flow duration distribution based on a plurality of flow durations measured in advance.

The control unit 13 controls the entire registration device 10. The control unit 13 is an electronic circuit such as a CPU (Central Processing Unit) or an MPU (Micro Processing unit) or an integrated circuit such as an ASIC (Application Specific Integrated Circuit) or an FPGA (Field Programmable Gate Array). The control unit 13 includes an internal memory for storing a program and control data specifying various processing procedures and executes respective kinds of processing using the internal memory. Various programs operate, whereby the control unit 13 functions as various processing units. The control unit 13 includes an extracting unit 131, a filter unit 132, and a registering unit 133.

The extracting unit 131 extracts inner header information and outer header information of an encapsulated packet, an input of which is received, in order to select a set of inner flows arriving anew. The extracting unit 131 extracts a set of 5-tuples of an inner header and an outer header of the encapsulated packet.

The filter unit 132 selects registration target inner header information and outpour header information and filters out the inner header information and the outer header information other than the registration target inner header information and outer header information. The filter unit 132 uses a hash table in which arrival information indicating whether a first packet of a series of flow has arrived is registered for each address. The filter unit 132 calculates a hash value of the inner header information and the outer header information as an address of the hash table. Specifically, the filter unit 132 calculates, as the address of the hash table, a hash value of information obtained by connecting a 5-tuple of an inner header and a 5-tuple of an outer header. The filter unit 132 causes, based on the hash table, the first packet of the series of flow to pass.

The registering unit 133 registers the inner header information and the outer header information of the first packet of the series of flow, which the filter unit 132 has caused to pass, in the DB 20 in association with each other. The registering unit 133 registers, as association information, time information and a set of the 5-tuple of the inner header and the 5-tuple of the outer header in the DB 20.

[Flow of Registration Processing]

Figure 4:
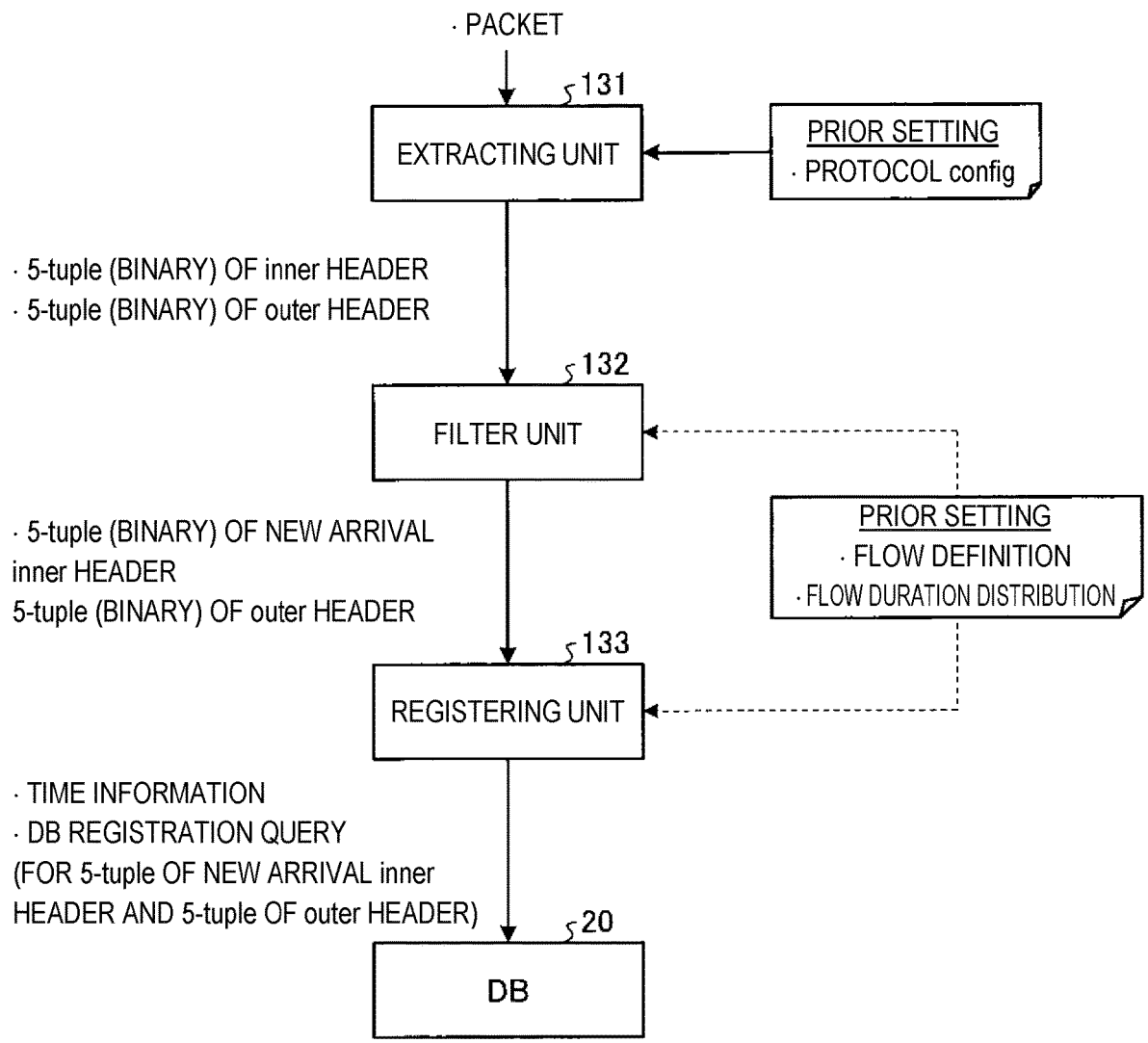
FIG. 4 is a diagram for explaining a flow of registration processing by the registration device shown in FIG. 1.
Figure 5:
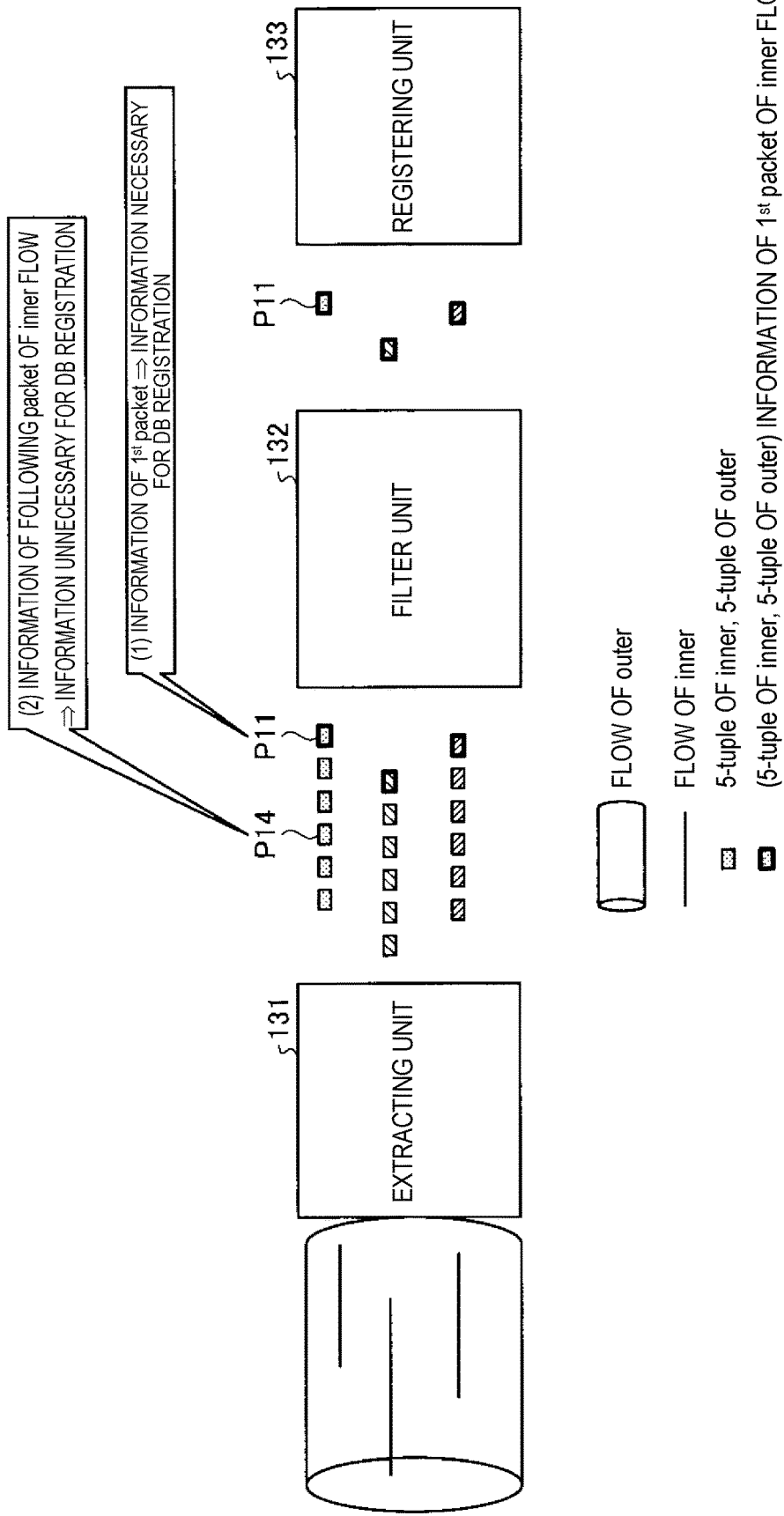
FIG. 5 is a diagram for explaining the flow of the registration processing by the registration device shown in FIG. 1.

Registration processing by the registration device 10 is explained. FIG. 4 and FIG. 5 are diagrams for explaining a flow of the registration processing by the registration device 10 shown in FIG. 1. In FIG. 4, the DB 20 is also described for explanation.

As shown in FIG. 4 and FIG. 5, when an encapsulated packet is input to the extracting unit 131, the extracting unit 131 extracts a set of 5-tuples of an inner header and an outer header of the encapsulated packet according to a protocol config set beforehand.

The filter unit 132 causes, based on a flow definition set beforehand and the flow duration distribution information 121 calculated beforehand, a 5-tuple of an inner header and a 5-tuple of an outer header of a first packet of a series of flow, that is, a packet arriving anew.

The registering unit 133 outputs a DB registration query for the 5-tuples of the inner header and the outer header of the packet arriving anew, which the filter unit 132 has caused to pass, to the DB 20 together with time information and registers the 5-tuples of the inner header and the outer header of the packet arriving anew in the DB 20.

For example, a packet P11 shown in FIG. 5 is a first packet ($1^{st}$ packet) of a series of flow, that is, a packet arriving anew and is information necessary for DB registration (see (1) in FIG. 5). Accordingly, the filter unit 132 causes information of the packet P11 to pass. In contrast, information of the following packet P14 of an inner flow is information unnecessary for DB registration because the information of the packet P11 is already registered (see (2) in FIG. 5). Therefore, the filter unit 132 filters out the information of the packet P14.

[Processing of the Filter Unit]

Figure 6:
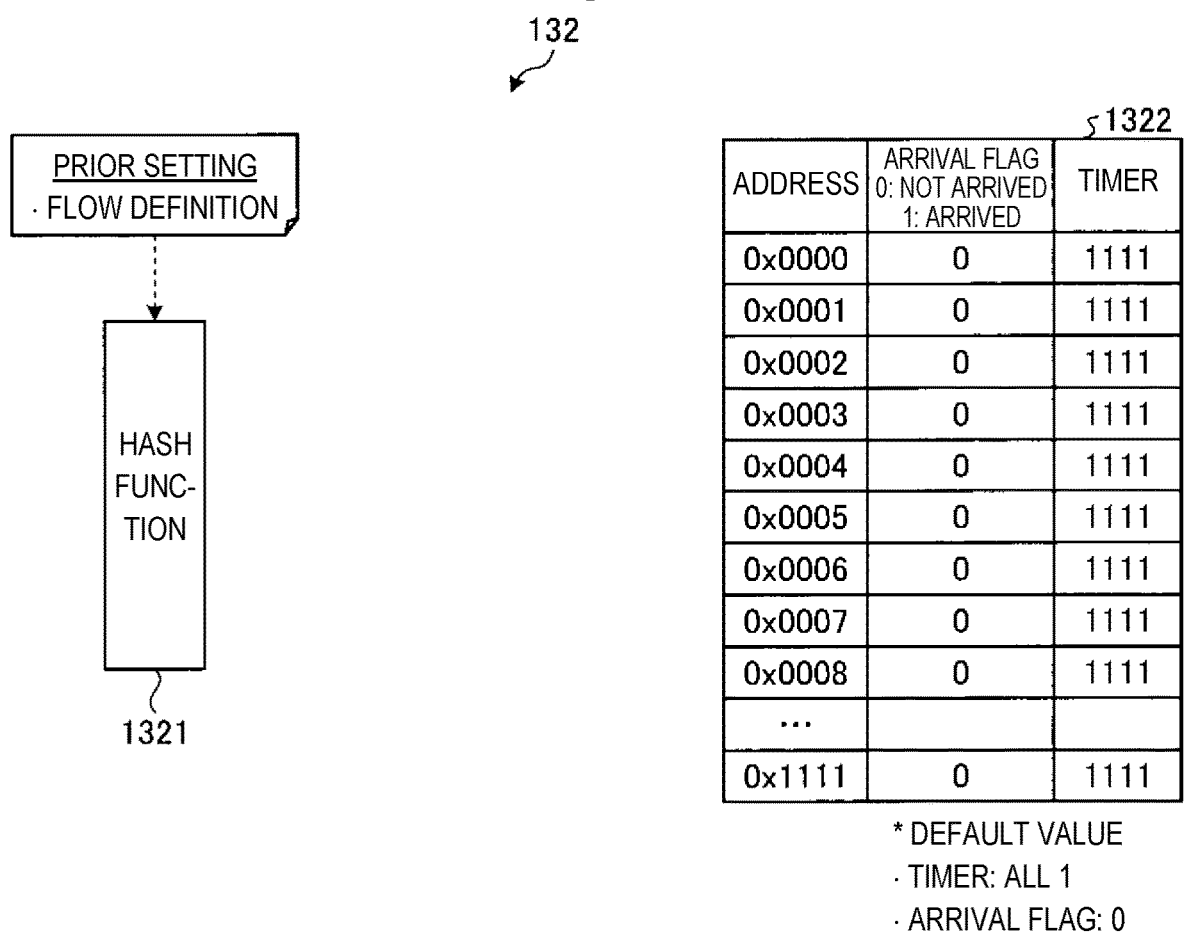
FIG. 6 is a diagram for explaining a function of a filter unit shown in FIG. 3.

A processing content of the filter unit 132 is explained. FIG. 6 is a diagram for explaining a function of the filter unit 132 shown in FIG. 3.

As shown in FIG. 6, the filter unit 132 performs filtering using a hash function unit 1321 that calculates a hash value based on a flow definition set before hand and a hash table 1322.

The hash table 1322 includes items of an address, an arrival flag, which is arrival information, and a timer. The arrival flag is a flag indicating whether a first packet of a series of flow has arrived. The arrival flag is used to discriminate whether 5-tuple information of an inner flow is 5-tuple information of a flow arriving anew. The arrival flag "0" indicates that the first packet has not arrived and the arrival flag "1" indicates that the first packet has arrived. The timer is a countdown timer used to perform periodic entry refresh in order to suppress hash collision. A default value of the arrival flag is "0". A default value of the timer is all "1".

Figure 7:
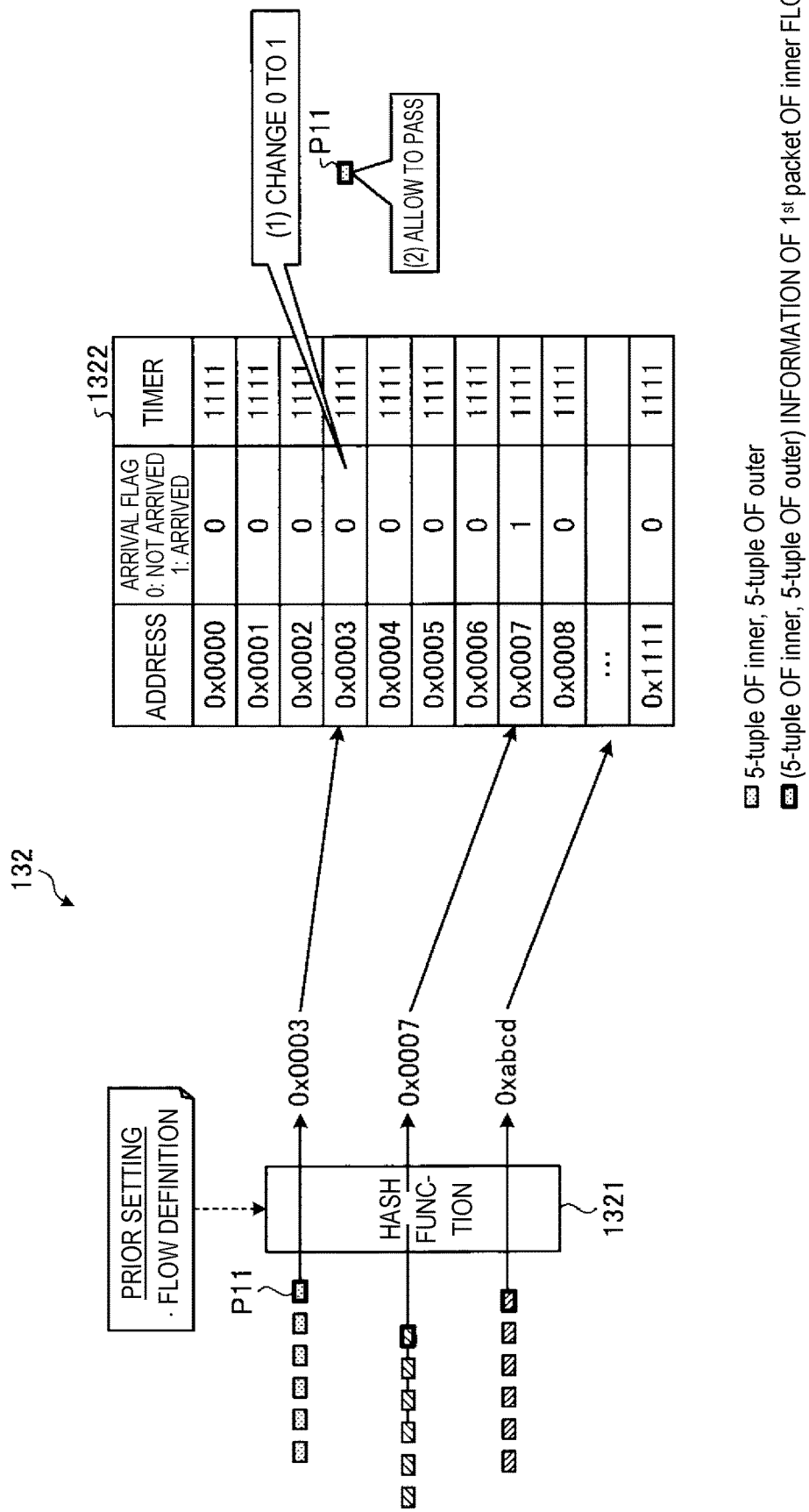
FIG. 7 is a diagram for explaining a flow of processing of the filter unit shown in FIG. 3.
Figure 8:
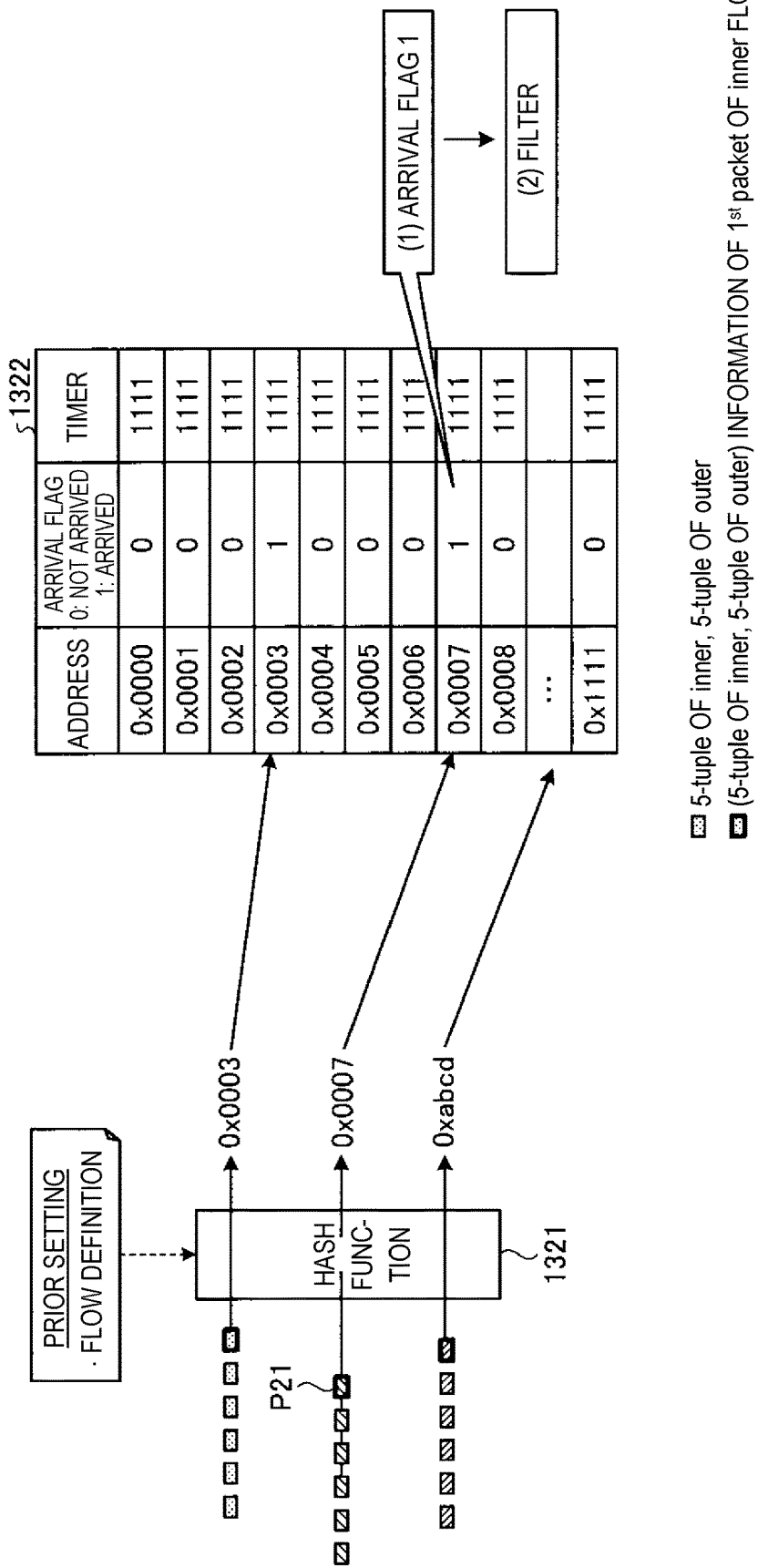
FIG. 8 is a diagram for explaining the flow of the processing of the filter unit shown in FIG. 3.

FIG. 7 and FIG. 8 are diagrams for explaining a flow of processing of the filter unit 132 shown in FIG. 3. The hash function unit 1321 receives an input of the flow definition and information concerning the 5-tuple of the inner header and the 5-tuple of the outer header and calculates, using a hash function, as an address, an information hash value obtained by connecting the 5-tuple of the inner header and the 5-tuple of the outer header. The filter unit 132 accesses a row of the hash table 1322 with the calculated address.

Processing of the packet P11 is explained with reference to, for example, FIG. 7. In this case, the filter unit 132 accesses a row of a calculated address "0x0003" in the hash table 1322. Since the arrival flag in this row is "0", the packet P11 is a first packet of a series of flow. The filter unit 132 changes the arrival flag in the row of this address "0x0003" from "0" to "1" (see (1) in FIG. 7) and allows 5-tuples of an inner header and an outer header of the packet P11 to pass (see (2) in FIG. 7).

Processing of a packet P21 is explained with reference to FIG. 8. In this case, the filter unit 132 accesses a row of a calculated address "0x0007" in the hash table 1322. The arrival flag in this row is "1" (see (1) in FIG. 8). Accordingly, the packet P21 is a packet of a flow, a first packet of which has already arrived. Therefore, the filter unit 132 filters out information of the packet P21 (see (2) in FIG. 8).

Subsequently, entry refresh for the hash table 1322 is explained. If an old entry is left in the hash table 1322, collision easily occurs and filter accuracy is deteriorated. Therefore, the filter unit 132 refreshes the entry at predetermined timing and initializes the old entry based on flow duration distribution.

Figure 9:
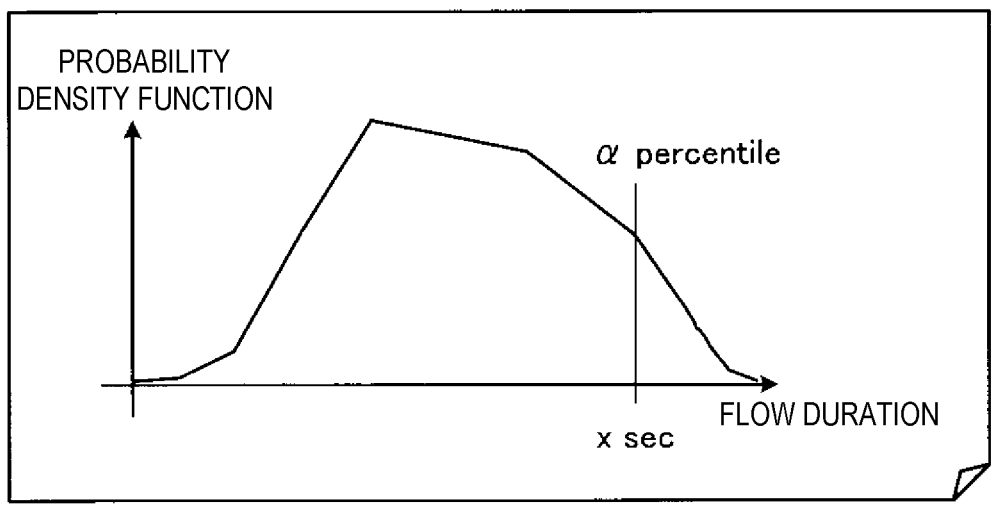
FIG. 9 is a diagram showing an example of flow duration distribution information.

FIG. 9 is a diagram showing an example of flow duration distribution information. In FIG. 9, a relation between flow duration and a probability density function is shown. FIG. 10 is a diagram for explaining entry refresh for the hash table 1322 shown in FIG. 6.

The filter unit 132 calculates flow duration x (sec) corresponding to an α percentile (0≤α≤1) from flow duration distribution illustrated in FIG. 9. The filter unit 132 sets refresh timing using this flow duration x (sec).

First, a case in which bit numbers of a timer are 1 or more is explained. In this case, the filter unit 132 sets a refresh interval to "x/(the bit numbers of the timer ^2)". The filter unit 132 decrements the timer at every refresh interval. The filter unit 132 changes an arrival flag of an entry, in which bit numbers of the timer are all "0", from "1" to "0" (see (1) in FIG. 10) and changes the timer to "1111" to thereby refresh the entry.

A case in which the bit numbers of the timer are other than 1 is explained. In this case, the filter unit 132 sets the refresh interval to "x". At every refresh interval, the filter unit 132 changes all arrival flags to "0" and changes the timer to the default value to refresh the entry. Note that the hash table 1322 includes an arrival flag field and a timer field in which bit numbers are relatively small. Since processing of the two fields is required, the hash table 1322 is stored in, for example, a high-speed and low-capacity cache.

[Processing Procedure of Registration Processing]

Figure 11:
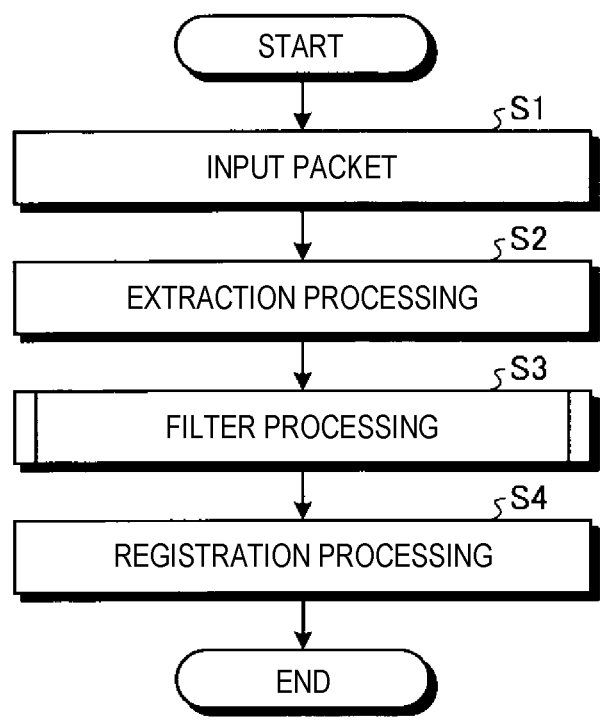
FIG. 11 is a flowchart showing a processing procedure of registration processing according to the first embodiment.

A processing procedure of registration processing according to the first embodiment is explained. FIG. 11 is a flowchart showing the processing procedure of the registration processing according to the first embodiment.

As shown in FIG. 11, when the registration device 10 receives an input of an encapsulated packet (step S1), the extracting unit 131 performs extraction processing for extracting inner header information and outer header information of the encapsulated packet (step S2).

The filter unit 132 calculates a hash value of the inner header information and the outer header information as an address of a hash table and performs, based on a hash table in which arrival information is registered for each address, filter processing for causing a first packet of a series of flow to pass (step S3).

The registering unit 133 performs registration processing for registering inner header information and outer header information of the first packet of the series of flow, which the filter unit 132 has caused to pass, in the DB 20 in association with each other (step S4).

[Processing Procedure of the Filter Processing]

Figure 12:
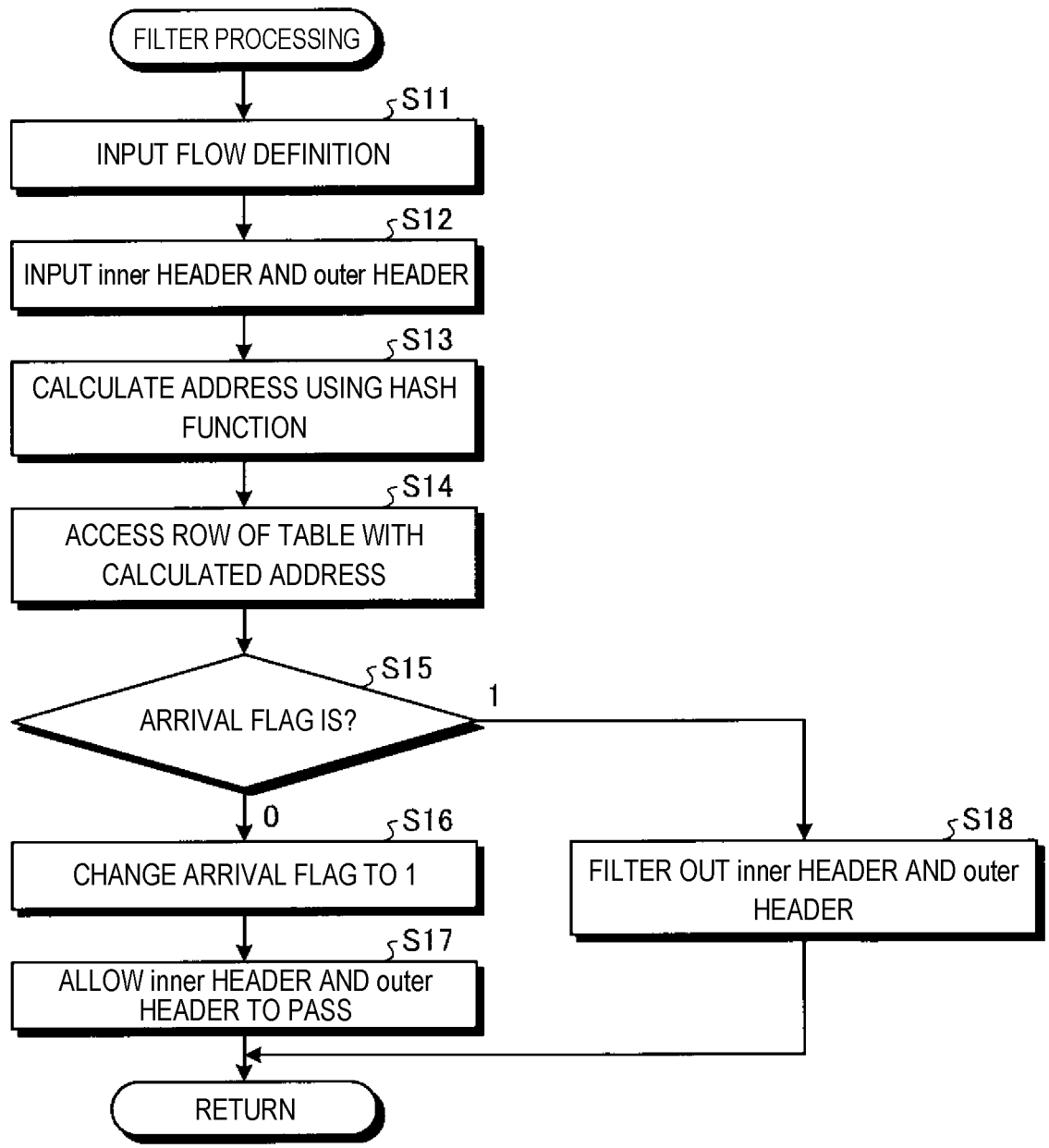
FIG. 12 is a flowchart showing a processing procedure of filter processing shown in FIG. 11.

Subsequently, the filter processing (step S3) shown in FIG. 11 is explained. FIG. 12 is a flowchart showing a processing procedure of the filter processing shown in FIG. 11.

As shown in FIG. 12, the filter unit 132 receives an input of flow definition information and information concerning a 5-tuple of an inner header and a 5-tuple of an outer header (steps S11 and S12) and calculates an address using the hash function (step S13). The filter unit 132 accesses a row of the hash table 1322 with the calculated address (step S14).

The filter unit 132 determines whether an arrival flag in the accessed row is "0" or "1" (step S15). When the arrival flag is "0" (step S15: 0), the filter unit 132 determines that this packet is a first packet of a series of flow and changes the arrival flag in the accessed row from "0" to "1" (step S16). The filter unit 132 allows 5-tuples of an inner header and an outer header of this packet to pass (step S17).

In contrast, when the arrival flag is "1" (step S15: 1), the filter unit 312 determines that the first packet is a packet of a flow that has already arrived and filters out the 5-tuples of the inner header and the outer header of the packet (step S18).

[Entry Refresh Processing of the Hash Table]

Figure 13:
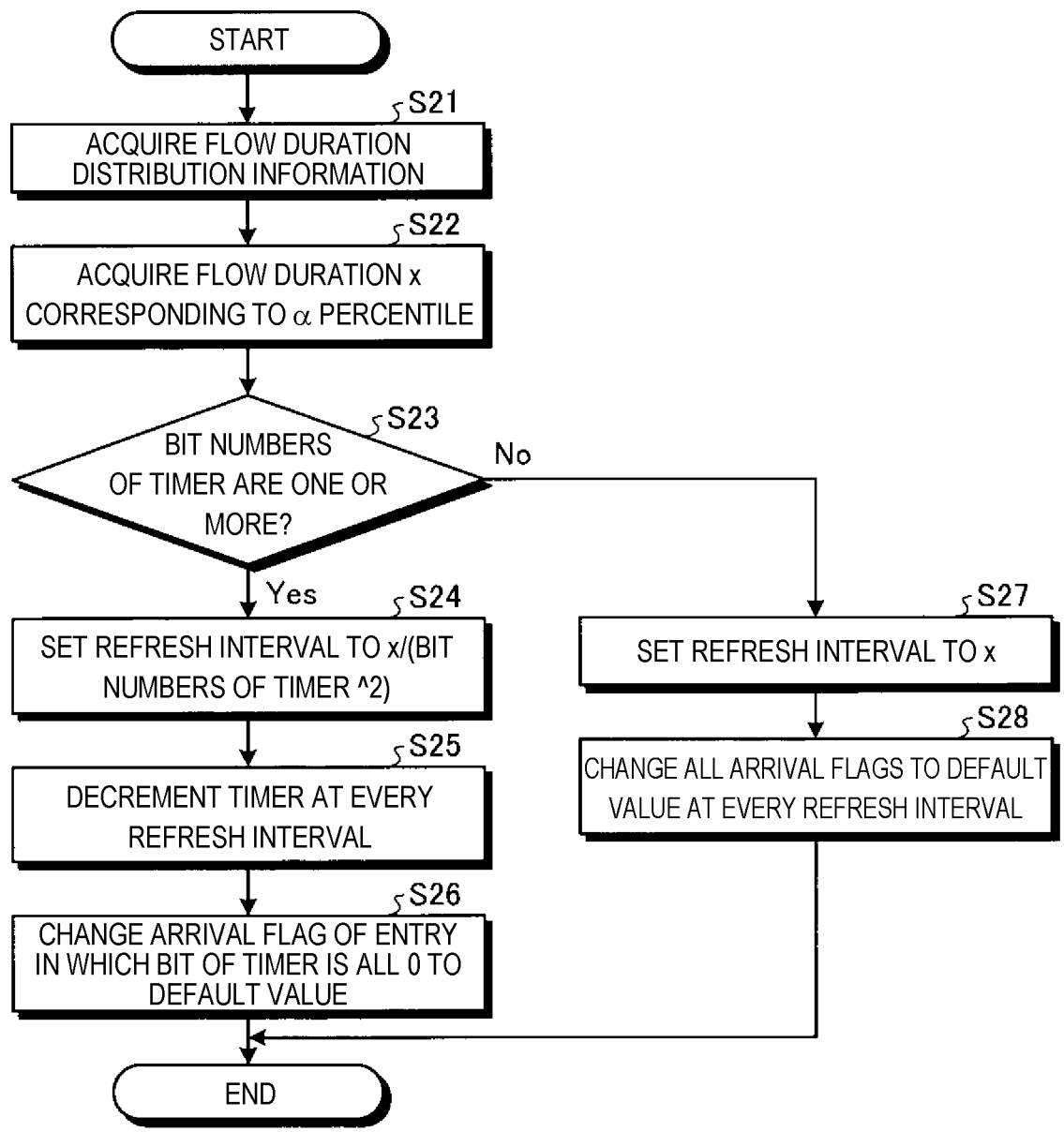
FIG. 13 is a flowchart showing a processing procedure of entry refresh processing for the hash table shown in FIG. 6.

Subsequently, entry refresh processing for the hash table 1322 is explained. FIG. 13 is a flowchart showing a processing procedure of the entry refresh processing for the hash table shown in FIG. 6.

As shown in FIG. 13, the filter unit 132 acquires flow duration distribution information (step S21) and acquires flow duration x (sec) corresponding to an α percentile (0≤α≤1) in flow duration distribution (step S22). The filter unit 132 determines whether bit numbers of the timer are one or more (step S23).

When the bit numbers of the timer is one or more (step S23: Yes), the filter unit 132 sets a refresh interval to "x/(the bit numbers of the timer ^2)" (step S24). The filter unit 132 decrements the timer at every refresh interval (step S25). The filter unit 132 changes an arrival flag of an entry, in which bit numbers of the timer are all "0", from "1" to "0", which is a default value (step S26) and refreshes the entry.

When the bit numbers of the timer are other than 1 (step S23: No), the filter unit 132 sets the refresh interval to "x" (step S27). The filter unit 132 changes all arrival flags to "0", which is a default value, for each refresh interval (step S28) and refreshes the entry.

Effects in the First Embodiment

As explained above, in the first embodiment, in the DB 20, the inner header information and the outer header information of the packet are registered in association with each other. Accordingly, the first embodiment enables retrieval of the outer header information from the inner header information or retrieval of the inner header information from the outer header information.

In the first embodiment, in the DB 20, only the association information of the inner header information and the outer header information of the first packet of the series of flow is registered. Accordingly, the first embodiment can reduce a processing load of information registration and enables an increase in speed of processing compared with when association information is registered about all packets. According to the first embodiment, since the number of the association information itself registered in the DB 20 is small compared with when the association information is registered about all the packets, a load for access to and retrieval from the DB 20 can be reduced. It is also possible to achieve an increase in speed of retrieval.

Second Embodiment

Figure 14:
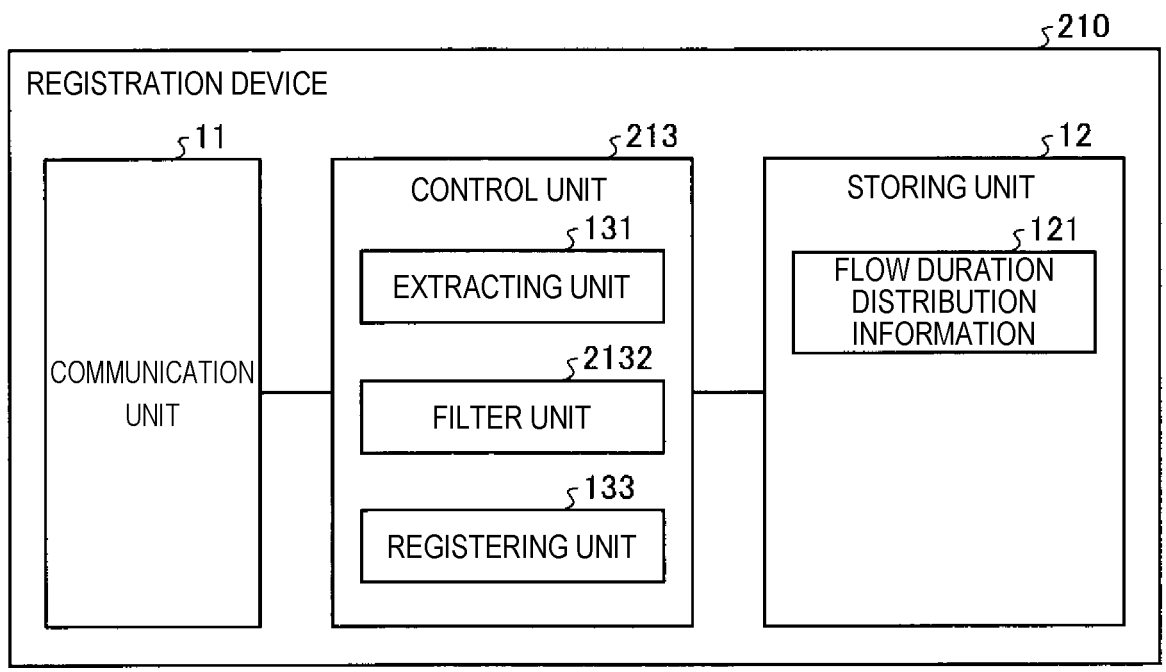
FIG. 14 is a diagram showing an example of the configuration of a registration device according to a second embodiment.

Subsequently, a second embodiment is explained. FIG. 14 is a diagram showing an example of the configuration of a registration device according to the second embodiment.

As shown in FIG. 14, a registration device 210 according to the second embodiment includes a control unit 213 instead of the control unit 13 shown in FIG. 3. The control unit 213 has the same function as the function of the control unit 13. The control unit 213 includes a filter unit 2132. The filter unit 2132 performs filter processing using a hash table indicating, as timeout time, arrival information indicating whether a first packet of a series of flow has arrived.

[Processing of the Filter Unit]

Figure 15:
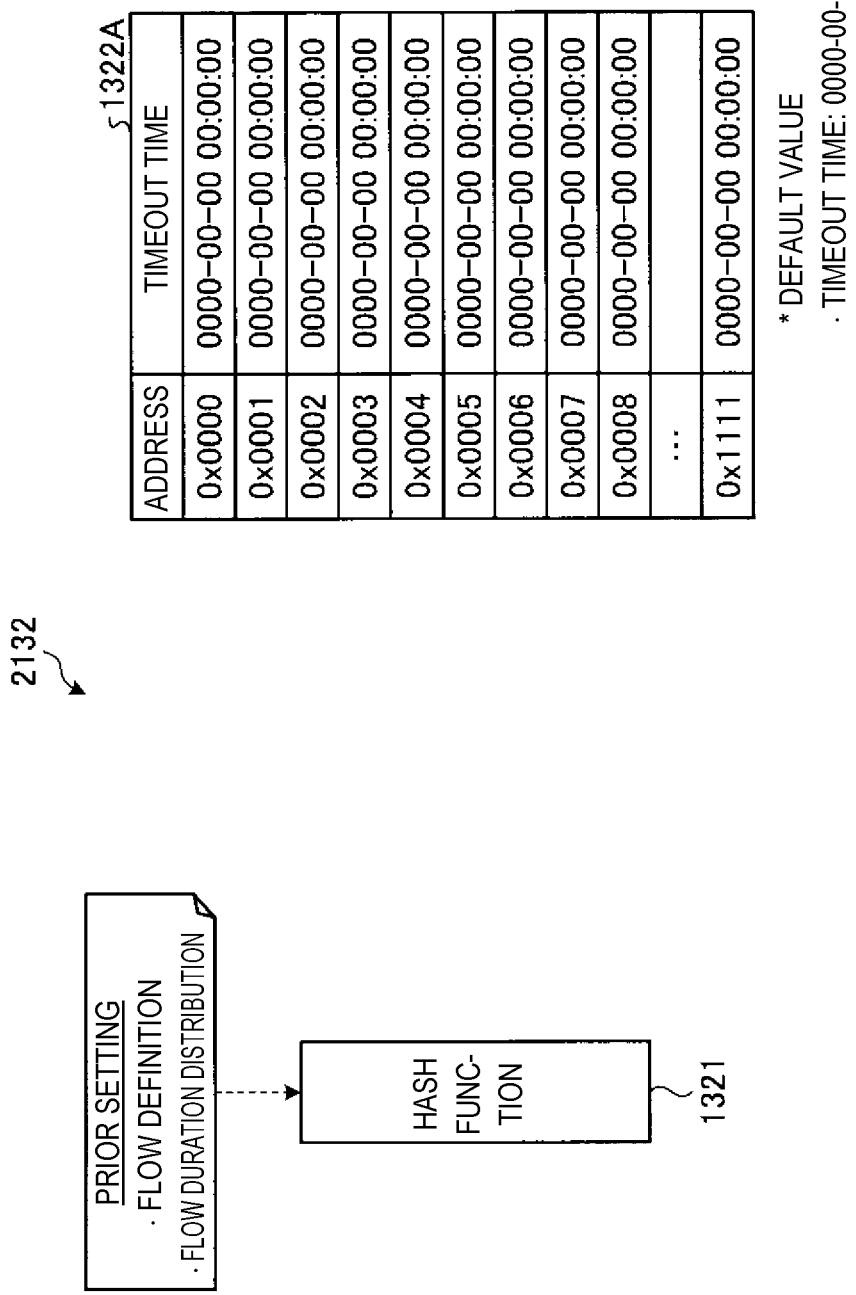
FIG. 15 is a diagram for explaining a function of a filter unit shown in FIG. 14.

Subsequently, a processing content of the filter unit 2132 is explained. FIG. 15 is a diagram for explaining a function of the filter unit 2132 shown in FIG. 14.

As shown in FIG. 15, the filter unit 2132 uses a hash table 1322A. The hash table 1322A includes an address and timeout time as items. The timeout time is used for execution of periodic entry refresh for suppression of hash collision. A default value of the timeout time is "0000-00-00 00:00:00".

Figure 16:
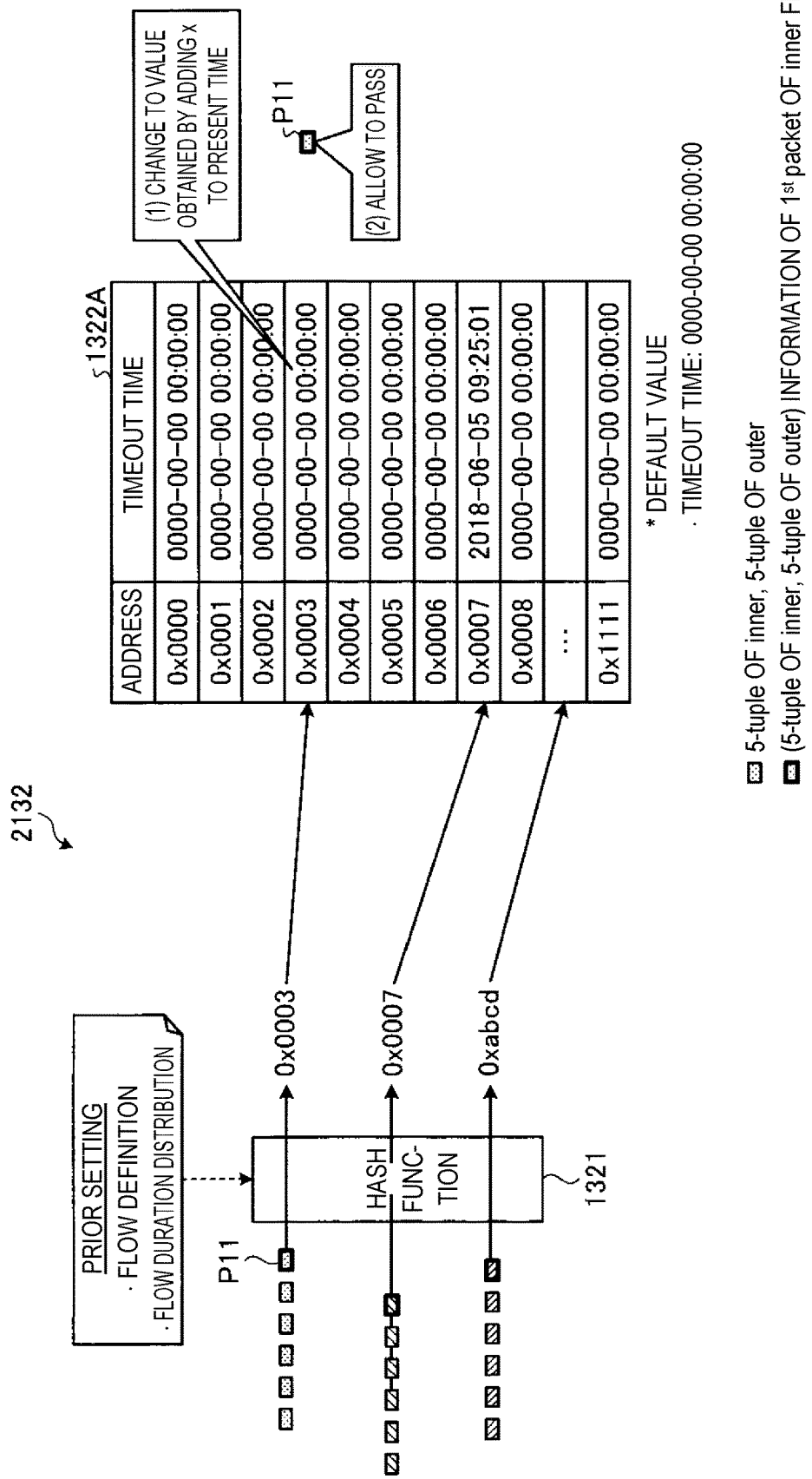
FIG. 16 is a diagram for explaining a flow of processing of the filter unit shown in FIG. 14.
Figure 17:
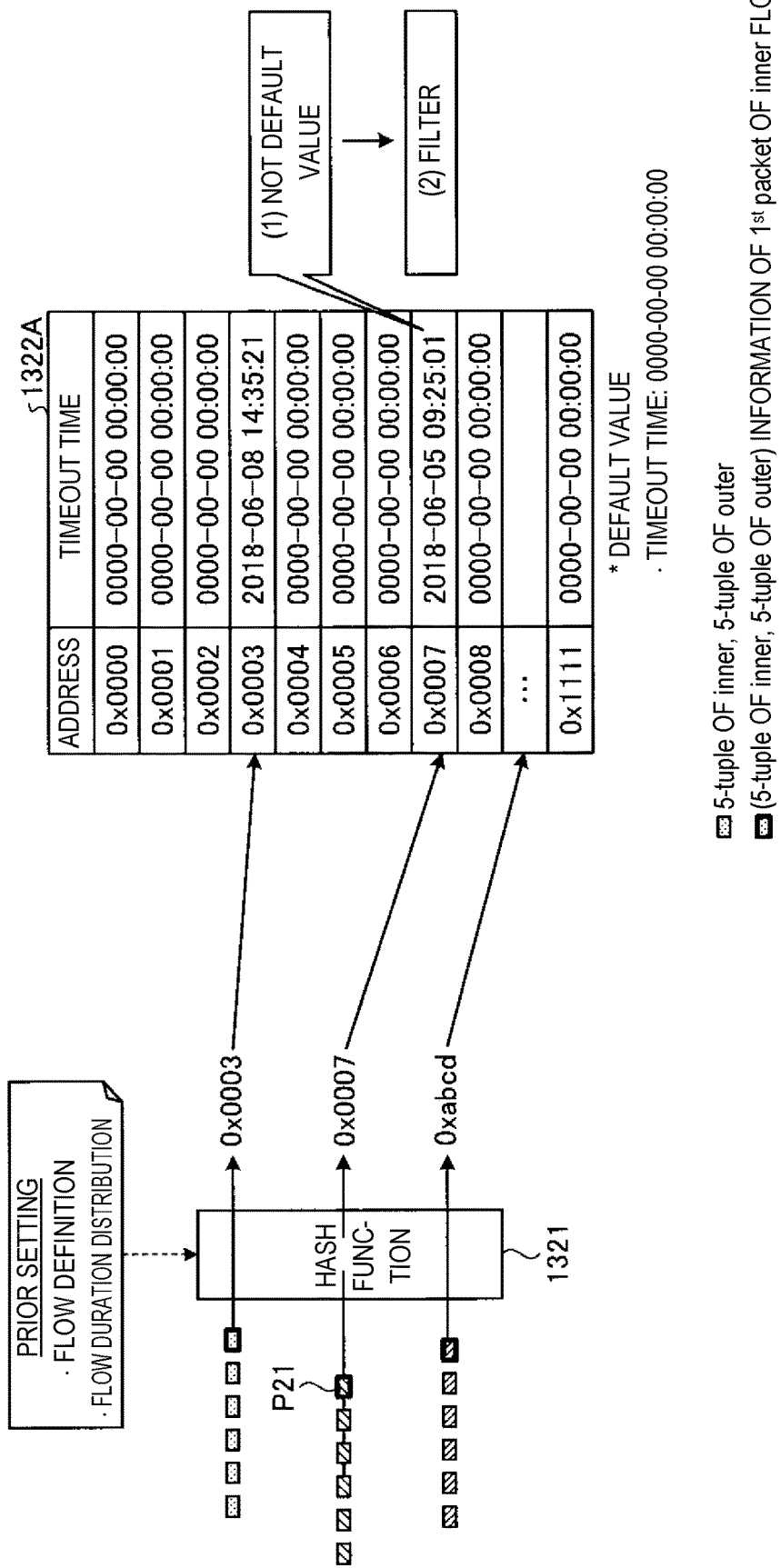
FIG. 17 is a diagram for explaining the flow of the processing of the filter unit shown in FIG. 14.

FIG. 16 and FIG. 17 are diagrams for explaining a flow of processing of the filter unit 2132 shown in FIG. 14. The hash function unit 1321 receives an input of the flow definition and information concerning the 5-tuple of the inner header and the 5-tuple of the outer header and calculates, using a hash function, as an address, an information hash value obtained by connecting the 5-tuple of the inner header and the 5-tuple of the outer header. The filter unit 2132 accesses a row of the hash table 1322A with the calculated address.

Processing of the packet P11 is explained with reference to, for example, FIG. 16. In this case, the filter unit 2132 accesses a row of a calculated address "0x0003" in the hash table 1322A. Since the timeout time in this row is the default value, the packet P11 is a first packet of a series of flow. Therefore, the filter unit 2132 changes the timeout time in the row of this address "0x0003" to time obtained by adding x (sec) to present time (see (1) in FIG. 16) and allows 5-tuples of an inner header and an outer header of the packet P11 to pass (see (2) in FIG. 16). The x (sec) is, for example, flow duration corresponding to an α percentile (0≤α≤1) in the flow duration distribution illustrated in FIG. 9.

Processing of a packet P21 is explained with reference to FIG. 17. In this case, the filter unit 2132 accesses a row of a calculated address "0x0007" in the hash table 1322A. The timeout time in this row is not the default value (see (1) in FIG. 17). Accordingly, the packet P21 is a packet of a flow, a first packet of which has already arrived. Therefore, the filter unit 2132 filters out the information of the packet P21 (see (2) in FIG. 17).

Subsequently, entry refresh for the hash table 1322A is explained. FIG. 18 is a diagram for explaining the entry refresh for the hash table 1322A shown in FIG. 15.

The filter unit 2132 refreshes timeout times of respective entries of the hash table 1322A at predetermined timing and suppresses collision. Specifically, the filter unit 2132 performs refresh of an entry in which present time exceeds the timeout time.

For example, a case in which present time exceeds timeout time "2018-06-05 09:25:01" of an address "0x0007" is explained. In this case, the filter unit 2132 changes the timeout time of this entry from "2018-06-05 09:25:01" to the default value "0000-00-00 00:00:00" (see (1) in FIG. 18) to thereby initialize the old entry. Note that, although the hash table 1322A includes a timeout time field in which bit numbers are relatively large, since only processing of the timeout time field is enough, the hash table 1322A is stored in, for example, a low-speed and high-capacity memory.

[Processing Procedure of Filter Processing]

Figure 19:
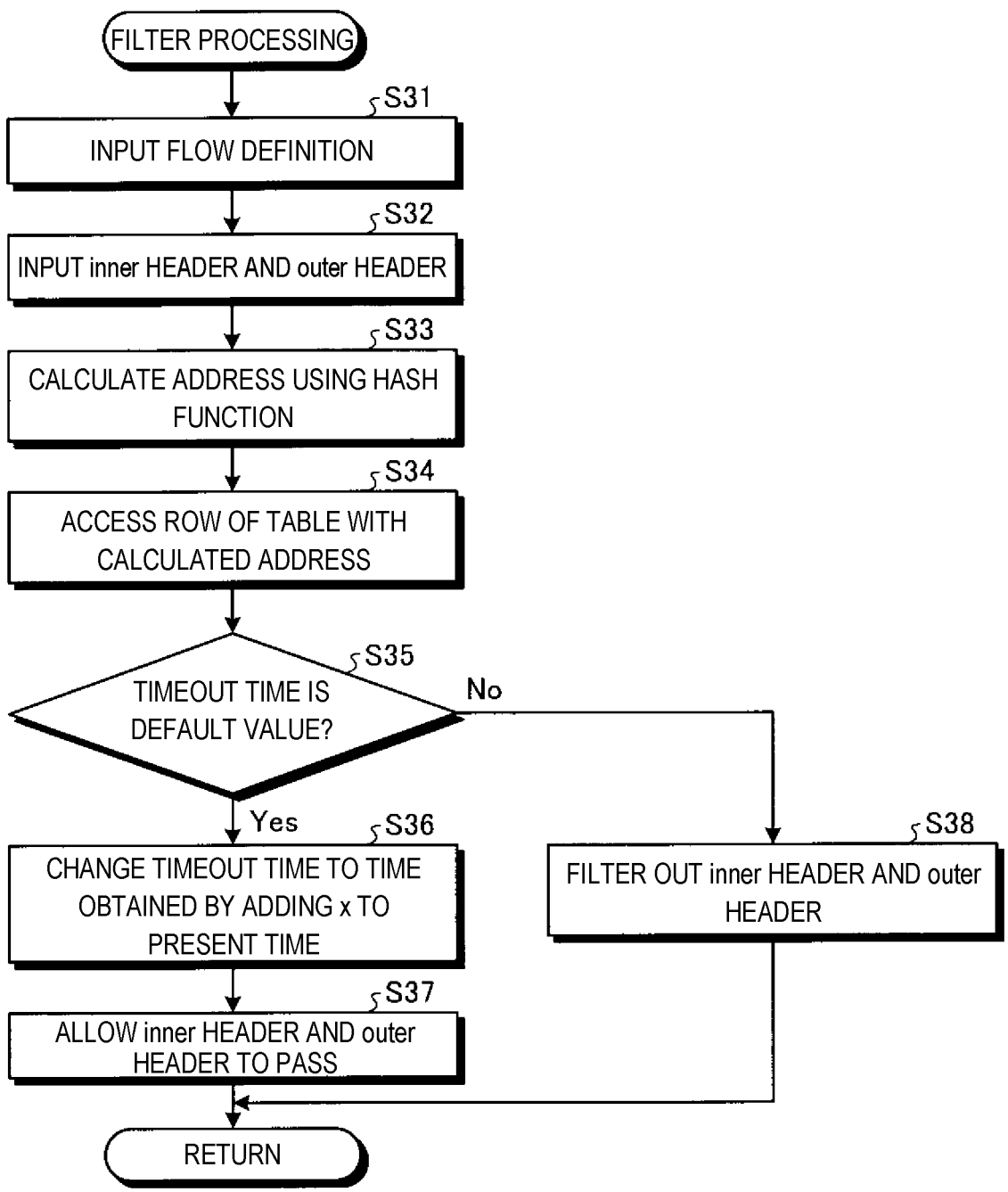
FIG. 19 is a flowchart showing a processing procedure of filter processing according to the second embodiment.

The registration device 210 executes the processing shown in FIG. 11 in the order shown in FIG. 11 to thereby perform registration processing. In the registration processing, filter processing is executed in a processing procedure different from the processing procedure shown in FIG. 12. Therefore, the filter processing according to the second embodiment is explained with reference to FIG. 19. FIG. 19 is a flowchart showing the processing procedure of the filter processing according to the second embodiment.

Step S31 to step S34 shown in FIG. 19 are the same processing as step S11 to step S14 shown in FIG. 12. The filter unit 2132 determines whether timeout time in the accessed row is the default value (step S35).

When the timeout time is the default value (step S35: Yes), the filter unit 2132 determines that this packet is a first packet of a series of flow and changes the timeout time in the accessed row to time obtained by adding x (sec) to present time (step S36). The filter unit 2132 allows 5-tuples of an inner header and an outer header of this packet to pass (step S37).

On the other hand, when the timeout time is not the default value (step S35: No), the filter unit 2132 determines that the first packet is a packet of a flow that has already arrived and filters out 5-tuples of an inner header and an outer header of this packet (step S38).

[Entry Refresh Processing for the Hash Table]

Figure 20:
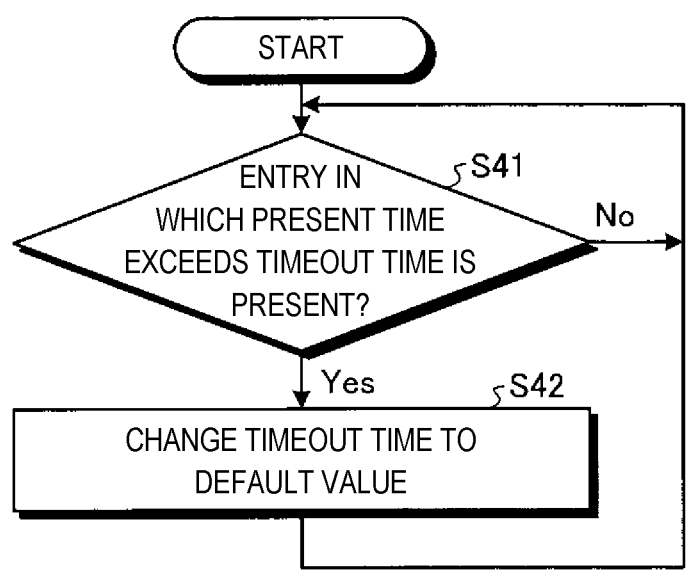
FIG. 20 is a flowchart showing a processing procedure of entry refresh processing of the hash table shown in FIG. 15.

Subsequently, entry refresh processing for the hash table 1322A is explained. FIG. 20 is a flowchart showing a processing procedure of the entry refresh processing for the hash table 1322A shown in FIG. 15.

The filter unit 2132 determines whether an entry in which present time exceeds the timeout time is present in the hash table 1322A (step S41). The filter unit 2132 repeats the processing in step S41 until determining that an entry in which present time exceeds the timeout time is present.

When an entry in which present time exceeds the timeout time is present (step S41: Yes), the filter unit 2132 changes the timeout time to the default value "0000-00-00 00:00:00" (step S42) and proceeds to step S41.

Effects in the Second Embodiment

As explained above, the filter unit 2132 performs the filter processing using the hash table indicating the arrival time as the timeout time and filters out inner header information and outer header information other than the inner header information and the outer header information of the first packet of the series of flow. As a result, in the second embodiment, as in the first embodiment, only the association information of the inner header information and the outer header information of the first packet of the series of flow is registered in the DB 20. Therefore, the same effects as the effects in the first embodiment are achieved.

Third Embodiment

Figure 21:
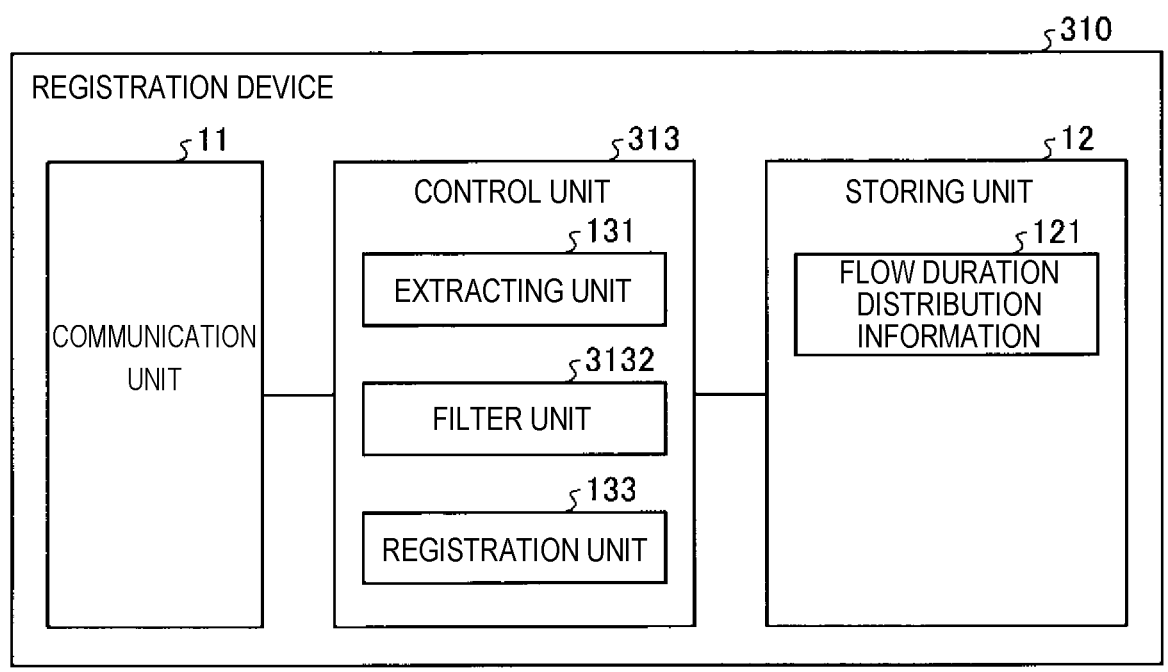
FIG. 21 is a diagram showing an example of the configuration of a registration device according to a third embodiment.

Subsequently, a third embodiment is explained. In the third embodiment, in filter processing, hash collision is suppressed and registration omission of association information in the DB 20 is prevented by calculating a collision detection bit (a collision detection value). FIG. 21 is a diagram showing an example of the configuration of a registration device according to the third embodiment.

As shown in FIG. 21, a registration device 310 according to the third embodiment includes a control unit 313 instead of the control unit 13 shown in FIG. 3. The control unit 313 has the same function as the function of the control unit 13. The control unit 313 includes a filter unit 3132.

The filter unit 3132 uses a hash table in which an arrival flag, which is arrival information, a detection bit (a detection value), and a timer are registered in association with an address. The detection bit is a hash value of inner header information, outer header information, and an address in a first packet of a series of flow. The detection bit is a hash value of information obtained by connecting a 5-tuple of an inner header, a 5-tuple of an outer header, and the address in the first packet of the series flow.

The filter unit 3132 calculates a hash value of inner header information and outer header information in a processing target packet as the address of the hash table. The filter unit 3132 calculates a hash value of the inner header information, the outer header information, and the address as a collision detection bit.

When the arrival flag indicates, in an entry of the same address as the address of the processing target packet in the hash table, that the first packet has not arrived, the filter unit 3132 causes the inner header information and the outer header information of the processing target packet to pass as inner header information and outer header information of the first packet.

When the arrival flag indicates that the first packet has already arrived and when the detection bit and the collision detection bit are the same value, the filter unit 3132 filters out inner header information and outer header information of this packet.

When the arrival flag indicates that the first packet has already arrived and when the detection bit and the collision detection bit are different, the filter unit 3132 detects collision. When detecting the collision, the filter unit 3132 samples the inner header information and the outer header information of the processing target packet and causes the inner header information and the outer header information to pass.

[Processing of the Filter Unit]

Figure 22:
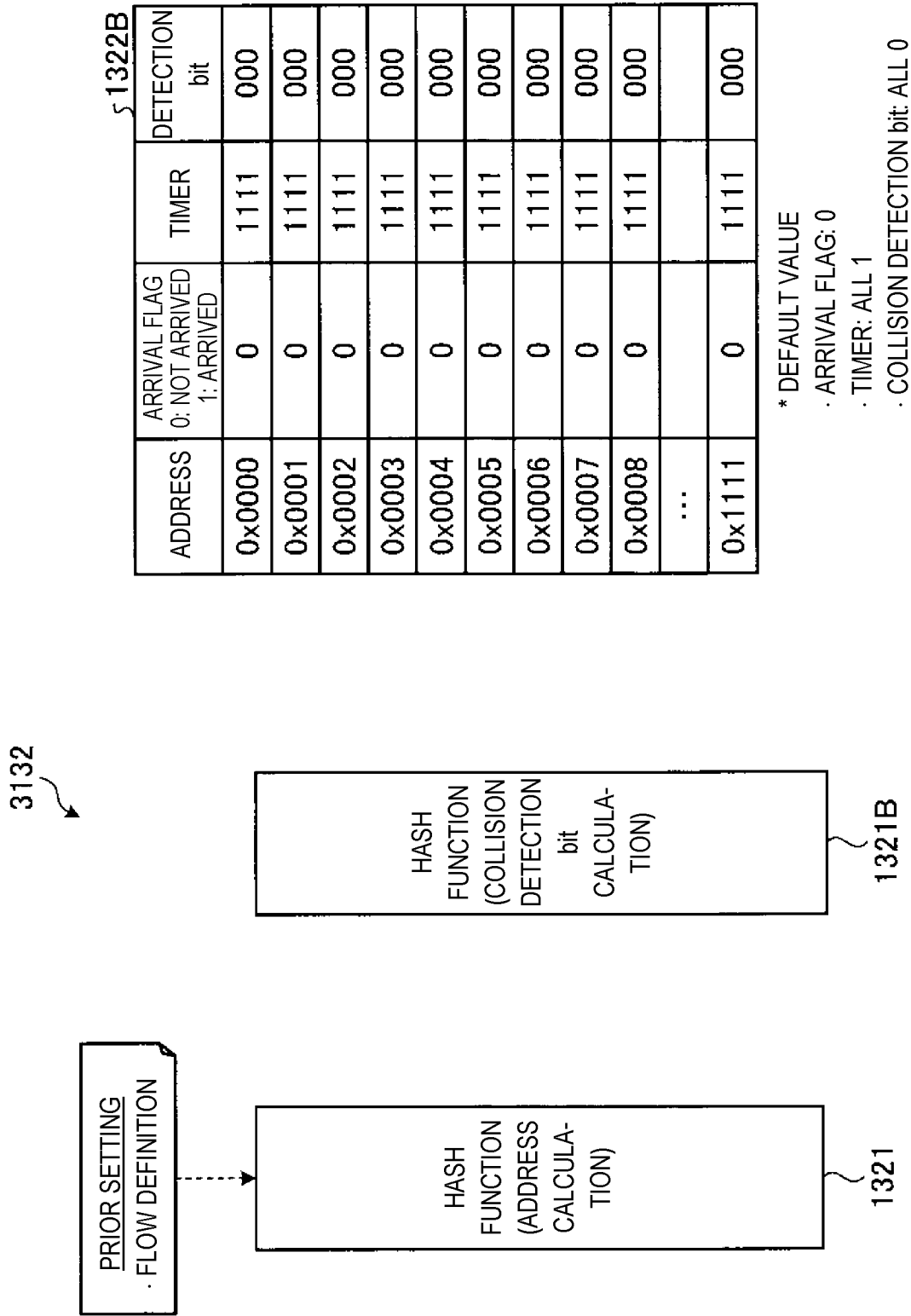
FIG. 22 is a diagram for explaining a function of a filter unit shown in FIG. 21.

Subsequently, a processing content of the filter unit 3132 is explained. FIG. 22 is a diagram for explaining a function of the filter unit 3132 shown in FIG. 21.

As shown in FIG. 22, the filter unit 3132 performs filter processing using a hash function unit 1321 for address calculation, a hash function unit 1321B for collision detection bit calculation, and a hash table 1322B.

The hash function unit 1321B receives an input of inner header information, outer header information, and an address and calculates a collision detection bit using a hash function. The hash table 1322B includes items of an address, an arrival flag, a timer, and a detection bit. The detection bit is used in order to detect collision of a hash. A default value of the detection bit is all "0".

FIG. 23 to FIG. 26 are diagrams for explaining a flow of processing of the filter unit 3132 shown in FIG. 21. The hash function unit 1321 receives an input of a flow definition and information concerning a 5-tuple of an inner header and a 5-tuple of an outer header and calculates, using the hash function, as an address, a hash value of information obtained by connecting the 5-tuple of the inner header and the 5-tuple of the outer header. The hash function unit 1321B receives an input of the 5-tuple of the inner header, the 5-tuple of the outer header, and the address calculated by the hash function unit 1321 and calculates, using the hash function, as a collision detection bit, a hash value of information obtained by connecting the 5-tuple of the inner header, the 5-tuple of the outer header, and the address calculated by the hash function unit 1321. The filter unit 3132 accesses a row of the hash table 1322B with the calculated address.

Processing of the packet P11 is explained with reference to, for example, FIG. 23. In this case, the filter unit 3132 accesses a row of an address "0x0003" in the hash table 1322B. Since the arrival flag in this row is "0", the packet P11 is a first packet of a series of flow.

Figure 23:
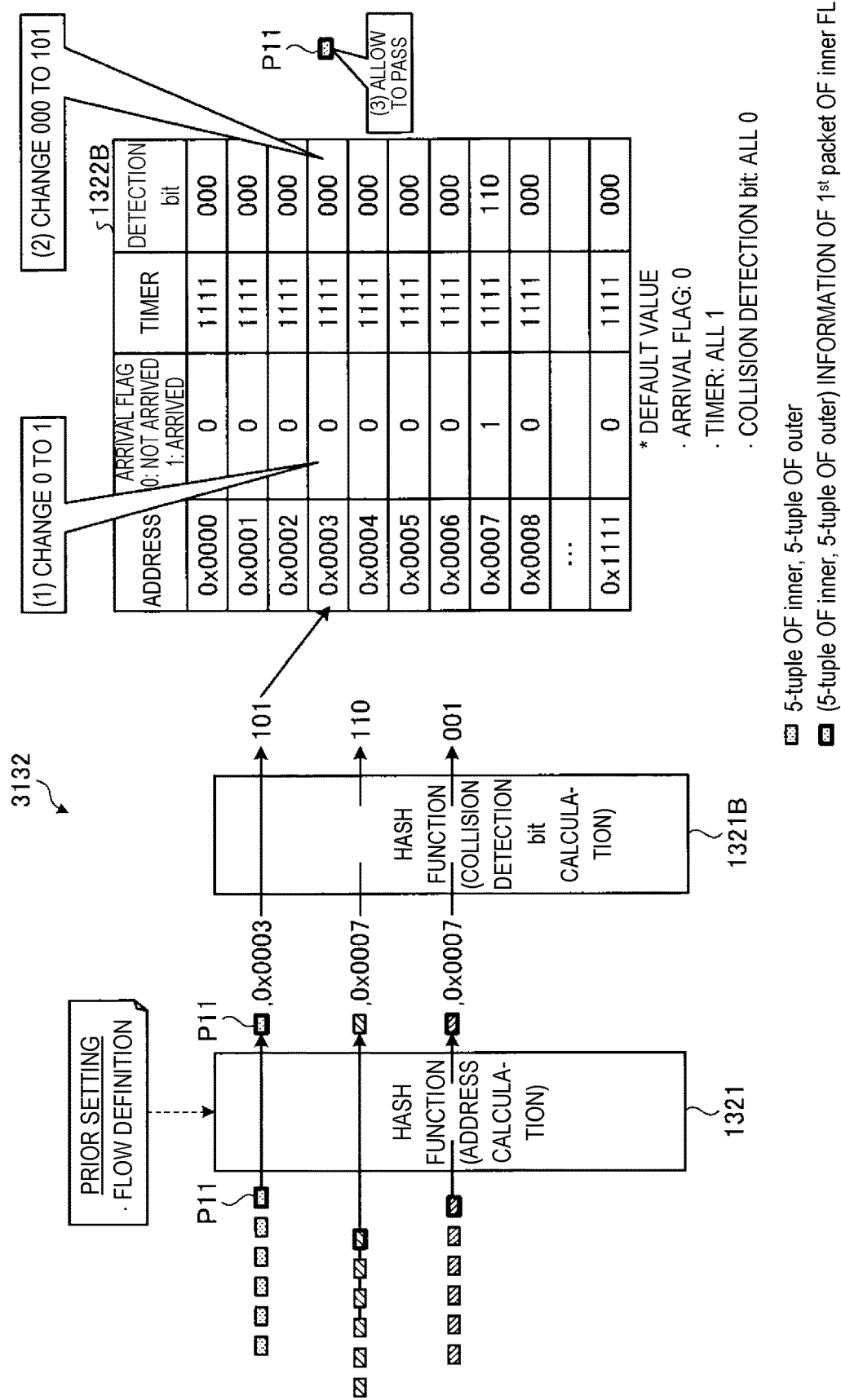
FIG. 23 is a diagram for explaining a flow of processing of the filter unit shown in FIG. 21.

Therefore, the filter unit 3132 changes the arrival flag in the row of the address "0x0003" from "0" to "1" (see (1) in FIG. 23). Subsequently, the filter unit 3132 changes the detection bit from the default value "000" to a collision detection bit "101" of the packet P11 calculated using the hash function unit 1321B (see (2) in FIG. 23). The filter unit 3132 allows 5-tuples of an inner header and an outer header of the packet P11 to pass (see (3) in FIG. 23).

Processing of the packet P21 is explained with reference to FIG. 24. In this case, the filter unit 3132 accesses a row of an address "0x0007" in the hash table 1322B. The arrival flag in this row is "1" (see (1) in FIG. 24) and a detection bit "110" and a collision detection bit "110" of the packet P21 calculated using the hash function unit 1321B are the same value (see (2) in FIG. 24).

Figure 24:
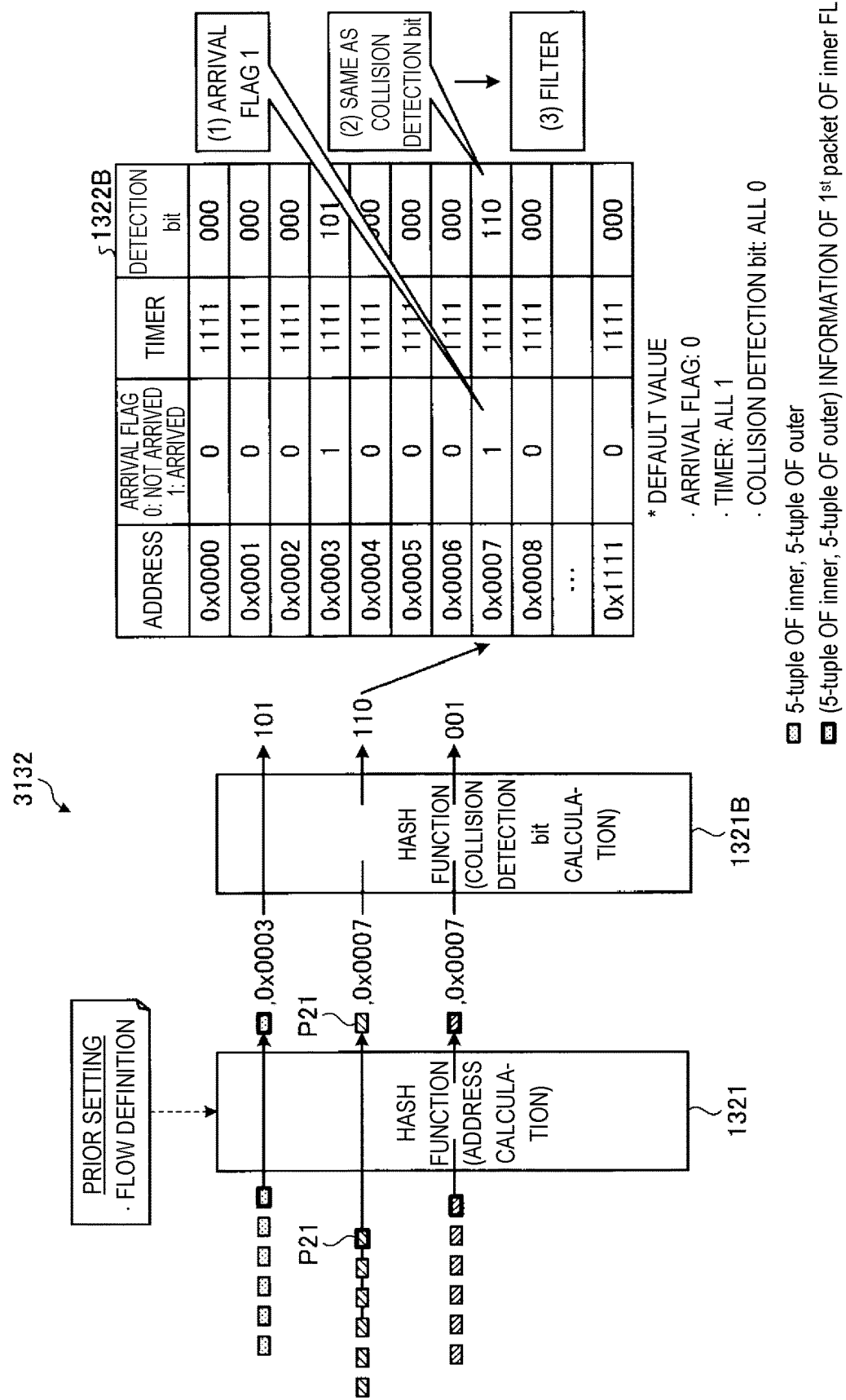
FIG. 24 is a diagram for explaining the flow of the processing of the filter unit shown in FIG. 21.

The filter unit 3132 determines that the packet P21 is a packet of a flow in which a first packet has already arrived and filters out the information of the packet P21 (see (3) in FIG. 24).

Processing of a packet P31 is explained with reference to FIG. 25 and FIG. 26. In this case, the packet P31 has the same address as the address of the packet P21 (see (1) in FIG. 25) and has an address in which a collision detection bit is different. The filter unit 132 accesses a row of an address "0x0007" in the hash table 1322.

Figure 25:
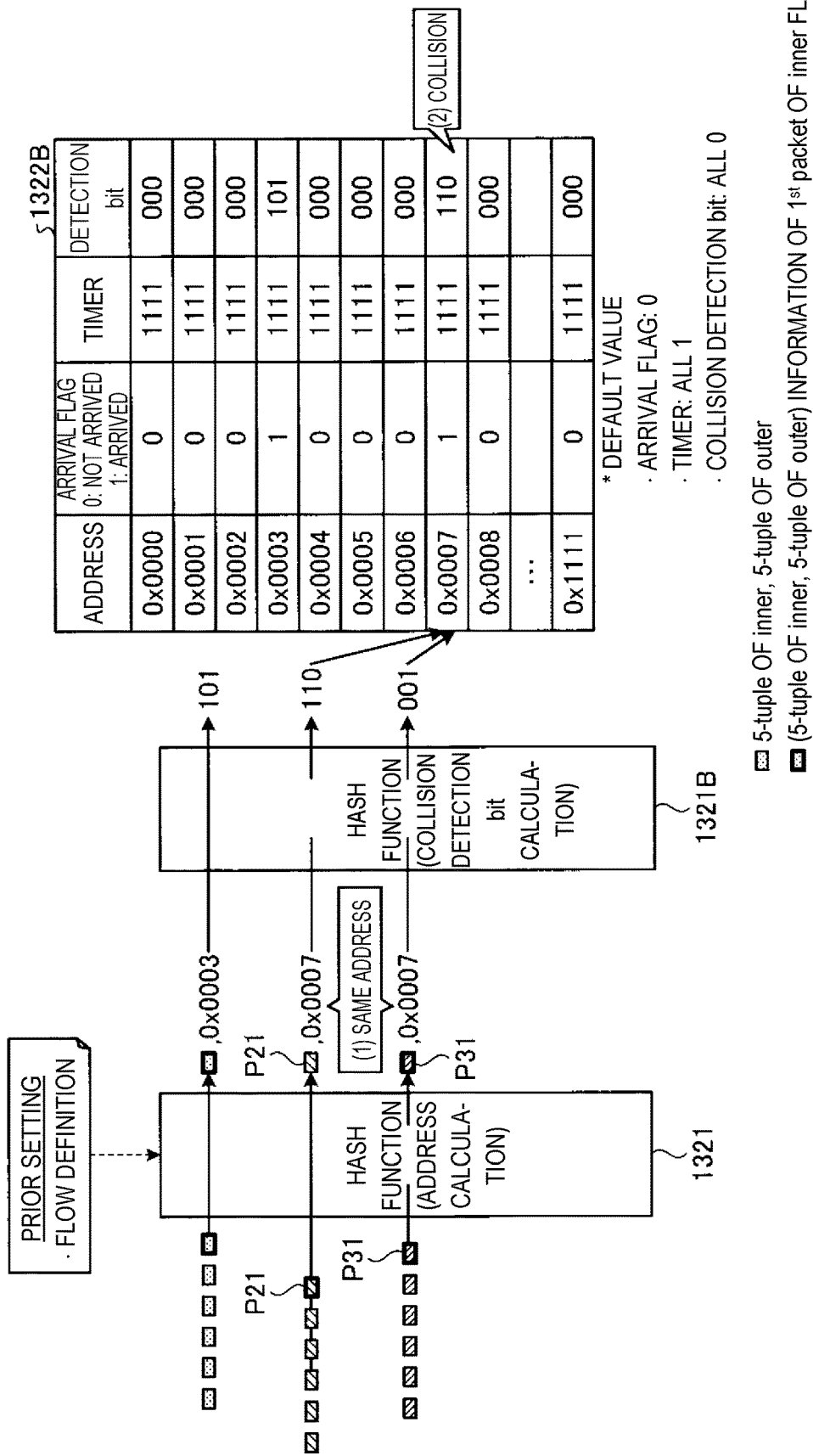
FIG. 25 is a diagram for explaining the flow of the processing of the filter unit shown in FIG. 21.
Figure 26:
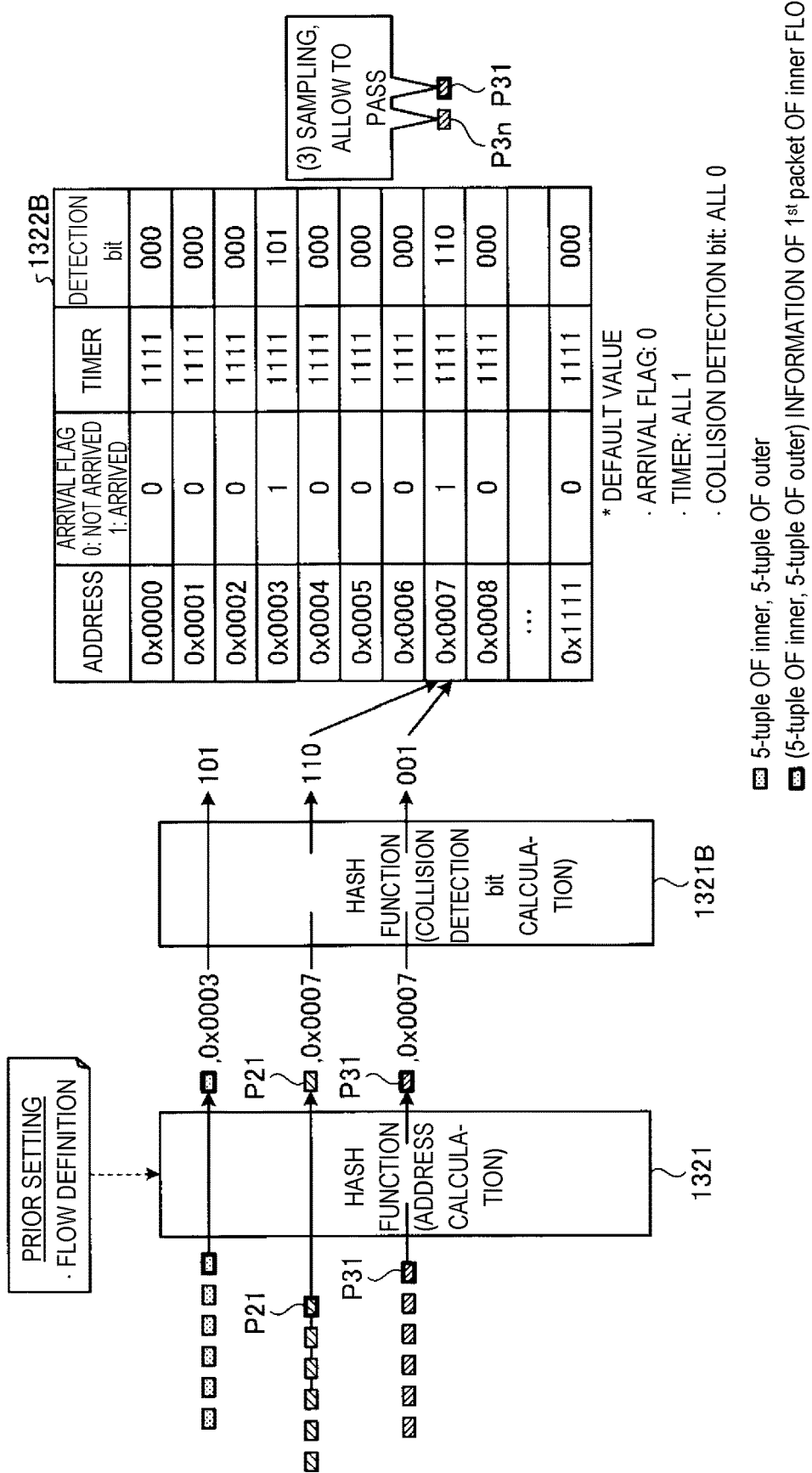
FIG. 26 is a diagram for explaining the flow of the processing of the filter unit shown in FIG. 21.

At this time, although the arrival flag in this row is "1", since a detection bit "110" and a calculated collision detection bit "001" of the packet P31 do not coincide, the filter unit 3132 detects collision (hash collision) (see (2) in FIG. 25). About a flow of the processing target packet P31, the filter unit 3132 samples packets and causes inner header information and outer header information to pass (see (3) in FIG. 26). For example, the filter unit 3132 samples one packet in one thousand packets from the flow of the packet P31 and causes the packet to pass. That is, about a flow of hash-colliding packets, the filter unit 3132 causes packets P31 and P3$n$, which are a part of the sampled packets, to pass.

Subsequently, entry refresh for the hash table 1322B is explained. FIG. 27 is a diagram for explaining entry refresh for the hash table 1322B shown in FIG. 22.

The filter unit 3132 refreshes an entry at predetermined timing based on flow duration distribution and initializes the old entry. A refresh interval is calculated based on the flow duration distribution and bit numbers allocated to the timer.

First, like the filter unit 132, the filter unit 3132 calculates flow duration x (sec) corresponding to an $\alpha$ percentile ($0 \le \alpha \le 1$) from flow duration distribution (see, for example, FIG. 9).

Subsequently, a case in which bit numbers of the timer are one or more is explained. In this case, as in the processing in the filter unit 132, the filter unit 3132 sets a refresh interval to "x/(the bit numbers of the timer ^2)" and decrements the timer at every refresh interval. The filter unit 3132 changes the arrival flag of an entry, in which bit numbers of the timer are all "0", from "1" to "0" (see (1) in FIG. 27) and changes the timer from "0000" to "1111" (see (2) in FIG. 27). Further, the filter unit 3132 changes the detection bit of this entry from "110" to "000" (see (3) in FIG. 27). Consequently, the filter unit 3132 refreshes the entry.

A case in which bit numbers of the timer are other than one is explained. In this case, the filter unit 3132 sets a refresh interval to "x". At every refresh interval, the filter unit 132 changes all arrival flags to "0", all timers to "111", and all detection bits to "000" and refresh entries.

[Processing Procedure of Filter Processing]

Figure 28:
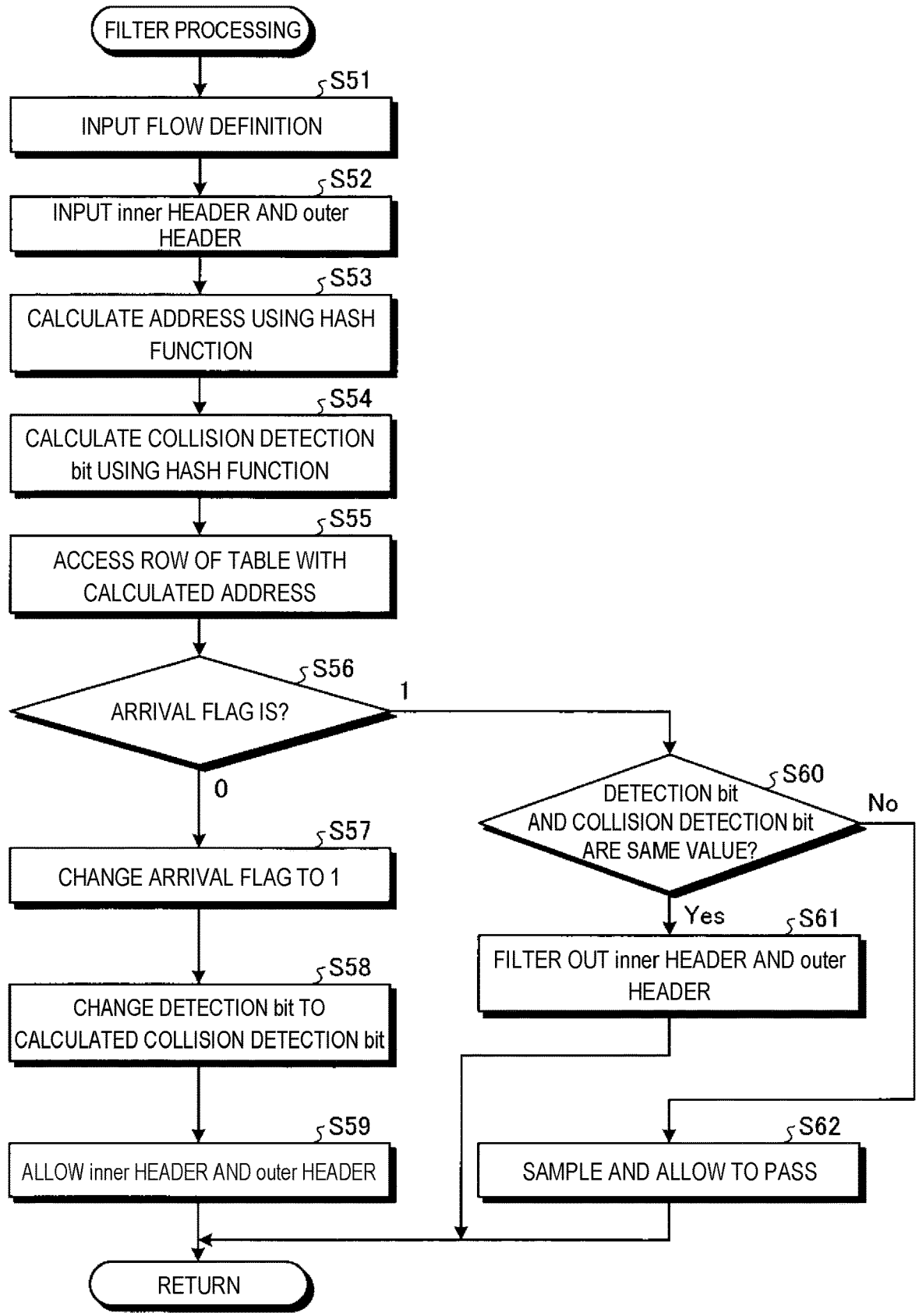
FIG. 28 is a flowchart showing a processing procedure of filter processing according to the third embodiment.

The registration device 310 executes the processing shown in FIG. 11 in the order shown in FIG. 11 to thereby perform registration processing. In the registration processing, filter processing is executed in a processing procedure different from the processing procedure shown in FIG. 12. Therefore, the filter processing according to the third embodiment is explained with reference to FIG. 28. FIG. 28 is a flowchart showing the processing procedure of the filter processing according to the third embodiment.

Step S51 to step S53 shown in FIG. 28 are the same processing as step S11 to step S13 shown in FIG. 11. The filter unit 3132 receives an input of inner header information, outer header information, and an address of a processing target packet and calculates a collision detection bit using the hash function (step S54). The filter unit 3132 accesses a row of the hash table 1322B with the calculated address (step S55).

When the arrival flag in the accessed row is "0" (step S56: 0), the filter unit 3132 determines that this packet is a first packet of a series of flow and changes the arrival flag in the accessed row from "0" to "1" (step S57). The filter unit 3132 changes the detection bit in this row to the collision detection bit calculated in step S54 (step S58). The filter unit 3132 allows 5-tuples of an inner header and an outer header of this packet to pass (step S59).

In contrast, when the arrival flag is "1" (step S56: 1), the filter unit 3132 determines whether the detection bit in this row and the collision detection bit calculated in step S54 are the same value (step S60).

When the detection bit and the collision detection bit are the same value (step S60: Yes), the filter unit 3132 determines that this packet is a packet of a flow that has already arrived and filters out 5-tuples of an inner header and an outer header of this packet (step S61).

On the other hand, when the detection bit and the collision detection bit are different values (step S60: No), the filter unit 3132 detects collision and, about a flow of the processing target packet, samples packets and allows 5-tuples of an inner header and an outer header to pass (step S62).

[Entry Refresh Processing for the Hash Table]

Figure 29:
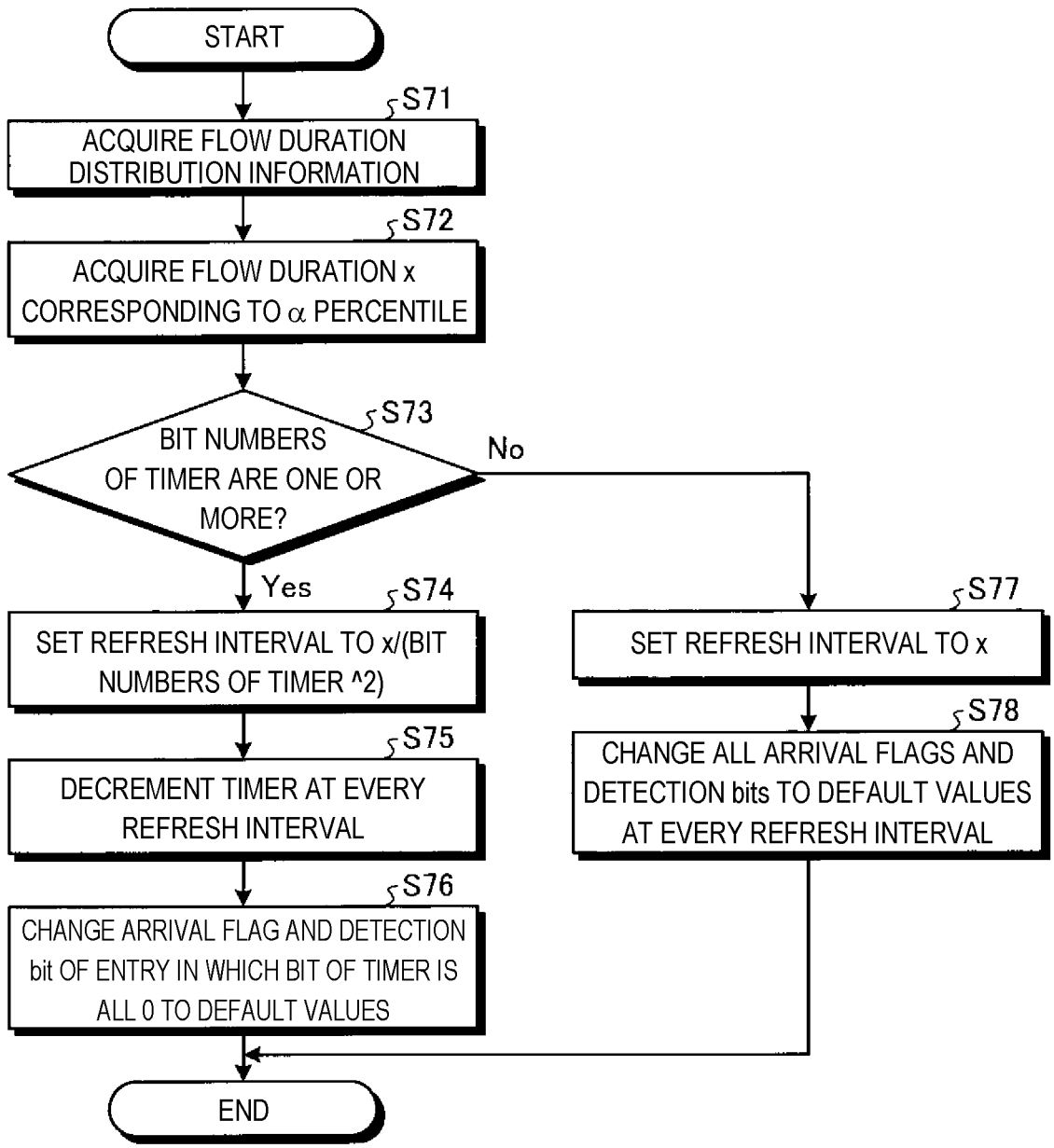
FIG. 29 is a flowchart showing a processing procedure of entry refresh processing for the hash table shown in FIG. 22.

Subsequently, entry refresh processing for the hash table 1322B is explained. FIG. 29 is a flowchart showing a processing procedure of the entry refresh processing for the hash table 1322B shown in FIG. 22.

Step S71 to step S75 shown in FIG. 19 are the same processing as steps S21 to 25 shown in FIG. 13. The filter unit 3132 changes the arrival flag and the detection bit of the entry, in which the bit numbers of the timer are all "0", to the default values (step S76) and refreshes the entry.

Step S77 shown in FIG. 29 is the same processing as step S27 shown in FIG. 13. The filter unit 3132 changes all the arrival flags and all the detection bits to the default values at every refresh interval (step S78) and refreshes the entries.

Effects in the Third Embodiment

As explained above, the registration device 310 according to the third embodiment can detect occurrence of collision by calculating the collision detection bit and comparing the collision detection bit with the detection bit registered in the hash table 1322B. A case in which collision occurs is a case in which two or more (the inner header and the outer header) combinations have the same hash value. The registration device 310 samples packets in which collision is detected and registers only one packet or the like in one thousand packets in the DB 20.

As explained above, even when combinations of inner header information and outer header information having different contents are calculated as the same hash value, the registration device 310 samples one combination and registers the combination in the DB 20. As a result, the third embodiment makes it possible to prevent registration omission of information and reduce a registration load on the DB 20.

Fourth Embodiment

Figure 30:
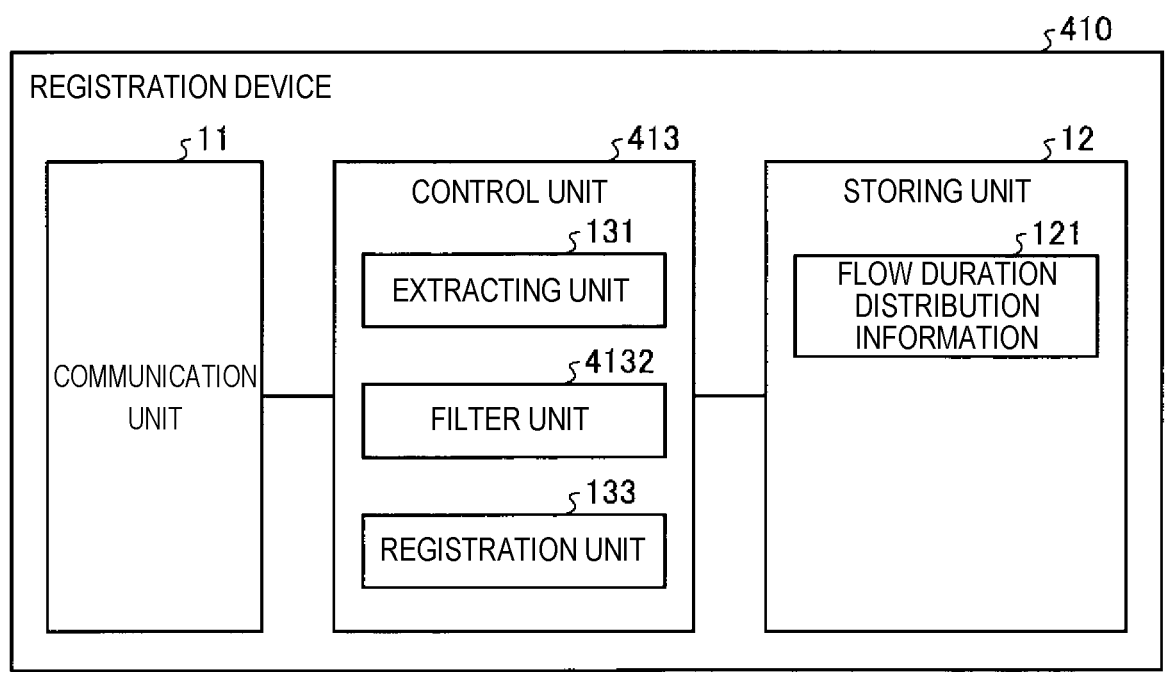
FIG. 30 is a diagram showing an example of the configuration of a registration device according to a fourth embodiment.

Subsequently, a fourth embodiment is explained. FIG. 30 is a diagram showing an example of the configuration of a registration device according to the fourth embodiment.

As shown in FIG. 30, a registration device 410 according to the fourth embodiment includes a control unit 413 instead of the control unit 213 shown in FIG. 14. The control unit 413 has the same function as the function of the control unit 213. The control unit 413 includes a filter unit 4132.

The filter unit 4132 uses a hash table in which timeout time, which is arrival information, and a detection bit are registered in association with an address. In filter processing, the filter unit 4132 further calculates a collision detection bit to thereby suppress hash collision and prevent registration omission of association information in the DB 20.

When the timeout time is a default value in an entry of the same address as an address of a processing target packet in the hash table, the filter unit 4132 causes inner header information and outer header information of the processing target packet to pass as inner header information and outer header information of a first packet.

When the timeout time is not the default value and the detection bit and the collision detection bit are the same value, the filter unit 4132 filters out the inner header information and the outer header information of this packet.

When the timeout time is not the default value and the detection bit and the collision detection bit are different, the filter unit 4132 detects collision. The filter unit 4132 registers the collision detection bit in the processing target packet in an empty entry of the hash table as the detection bit and causes the inner header information and the outer header information of the processing target packet to pass,

[Processing of the Filter Unit]

Figure 31:
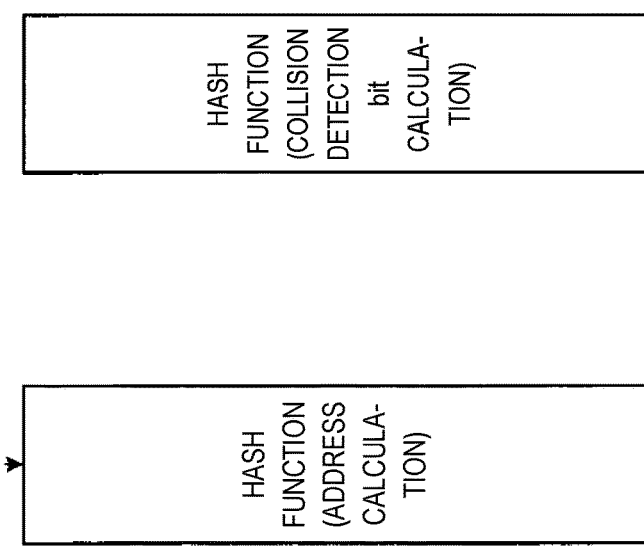
FIG. 31 is a diagram for explaining a function of a filter unit shown in FIG. 30.

Subsequently, a processing content of the filter unit 4132 is explained. FIG. 31 is a diagram for explaining a function of the filter unit 4132 shown in FIG. 30.

As shown in FIG. 31, the filter unit 4132 performs the filter processing using the hash function unit 1321 for address calculation, the hash function unit 1321B for collision detection bit calculation, and a hash table 1322C.

The hash table 1322C includes items of an address, timeout time, a detection bit, and a chain pointer. The chain pointer is used in order to access another entry when collision is occurring. A default value of the chain pointer is "0x0000".

FIG. 32 to FIG. 35 are diagram for explaining a flow of processing of the filter unit 4132 shown in FIG. 30. As in the third embodiment, the hash function unit 1321 receives an input of a flow definition and information concerning a 5-tuple of an inner header and a 5-tuple of an outer header and calculates, using a hash function, as an address, a hash value of information obtained by connecting the 5-tuple of the inner header and the 5-tuple of the outer header. The hash function unit 1321B receives an input of the 5-tuple of the inner header and the 5-tuple of the outer header and the address calculated by the hash function unit 1321 and calculates, using the hash function, as the collision detection bit, a hash value of information obtained by connecting the 5-tuple of the inner header, the 5-tuple of the outer header, and the address calculated by the hash function unit 1321. The filter unit 3132 accesses a row of the hash table 1322C with the calculated address.

Processing of the packet P11 is explained with reference to, for example, FIG. 32. In this case, the filter unit 3132 accesses a row of an address "0x0003" in the hash table 1322C. Since the timeout time in this row is the default value, the packet P11 is a first packet of a series of flow. Accordingly, the filter unit 3132 changes the timeout time in the row of the address "0x0003" from the default value to time obtained by adding x (sec) to present time (see (1) in FIG. 32). The x (sec) is, for example, flow duration corresponding to an α percentile (0≤α≤1), for example, from the flow duration distribution illustrated in FIG. 9.

Figure 32:
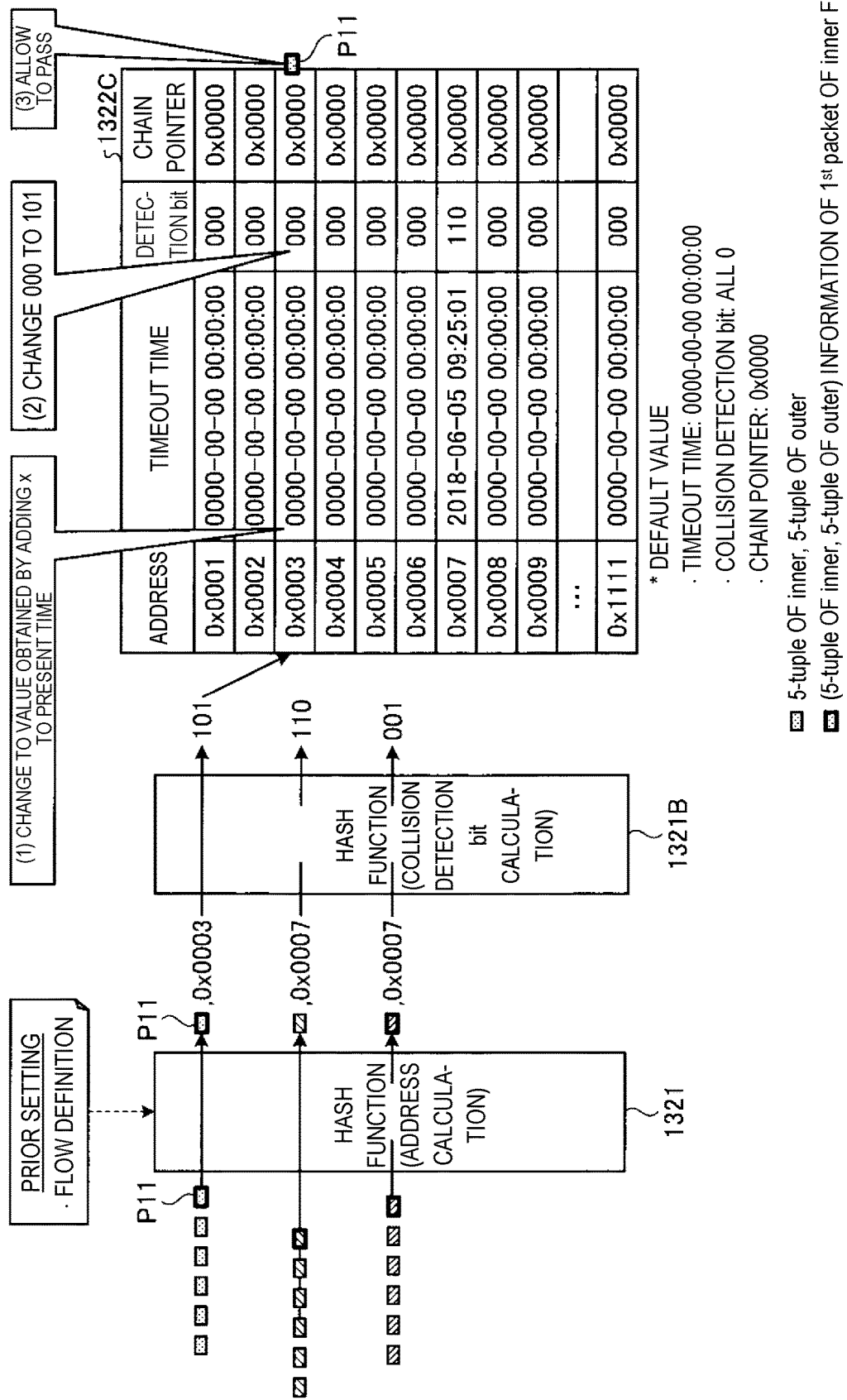
FIG. 32 is a diagram for explaining a flow of processing of the filter unit shown in FIG. 30.

The filter unit 4132 changes the detection bit from "000" to the collision detection bit "101" of the packet P11 (see (2) in FIG. 32). Subsequently, the filter unit 4132 allows the 5-tuples of the inner header and the outer header of the packet P11 to pass (see (3) in FIG. 32).

Figure 33:
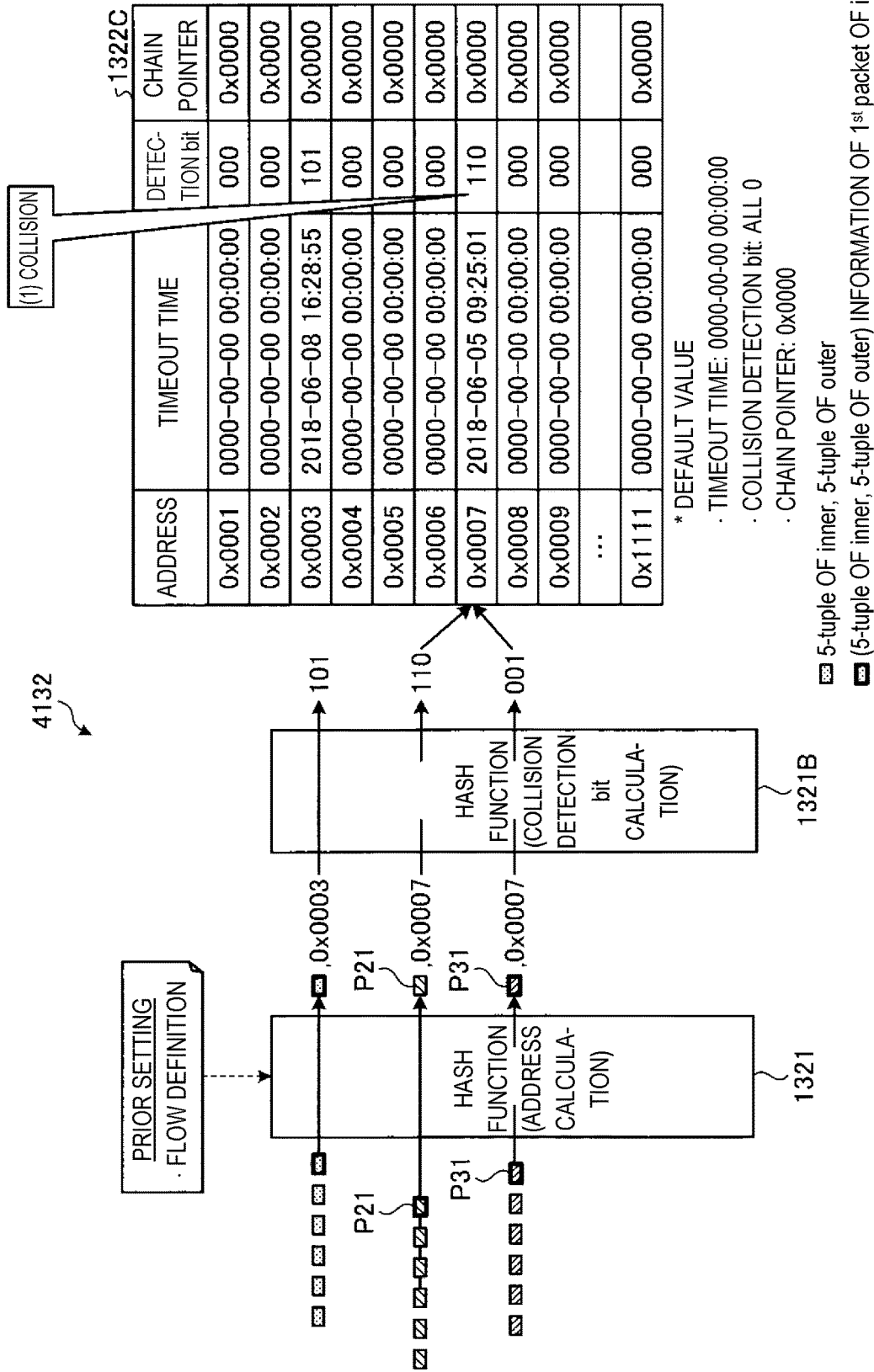
FIG. 33 is a diagram for explaining the flow of the processing of the filter unit shown in FIG. 30.

Processing of the packet P31 is explained with reference to FIG. 33 and FIG. 34. In this case, the filter unit 4132 accesses a row of the calculated address "0x0007" in the hash table 1322C. Since the timeout time in this row is not the default value and the detection bit "110" in this row and the calculated collision detection bit "001" of P31 do not coincide, the filter unit 4132 detects collision (see (1) in FIG. 33 and (1) in FIG. 34).

In this case, when the chain pointer in the row of the address "0x0007" is the default value, the filter unit 4132 registers information of the packet P31 in another empty entry using open addressing. Specifically, the filter unit 4132 changes the chain pointer in the row of the address "0x0007" from "0x0000" to an address "0x0009" of the empty entry calculated by the open addressing (see (2) in FIG. 34).

Figure 34:
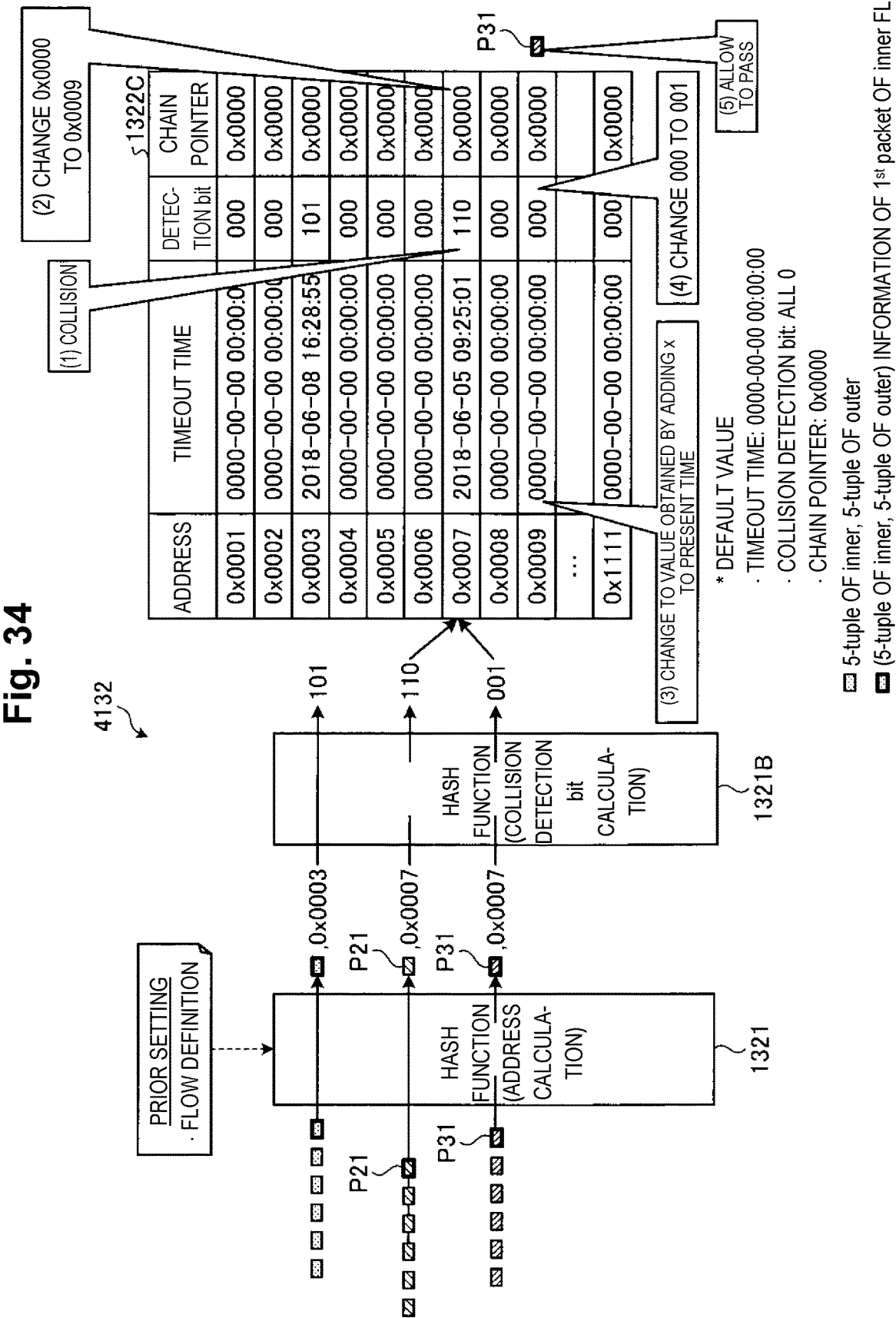
FIG. 34 is a diagram for explaining the flow of the processing of the filter unit shown in FIG. 30.

The filter unit 4132 advances to a row of the address "0x0009" and changes the timeout time in this row from the default value to time obtained by adding x (sec) to present time (see (3) in FIG. 34). The filter unit 4132 changes the detection bit from the default value "000" to the calculated collision detection bit "101" of the packet P31 (see (4) in FIG. 34). Subsequently, the filter unit 3132 allows 5-tuples of an inner header and an outer header of the packet P31 to pass (see (5) in FIG. 34).

Figure 35:
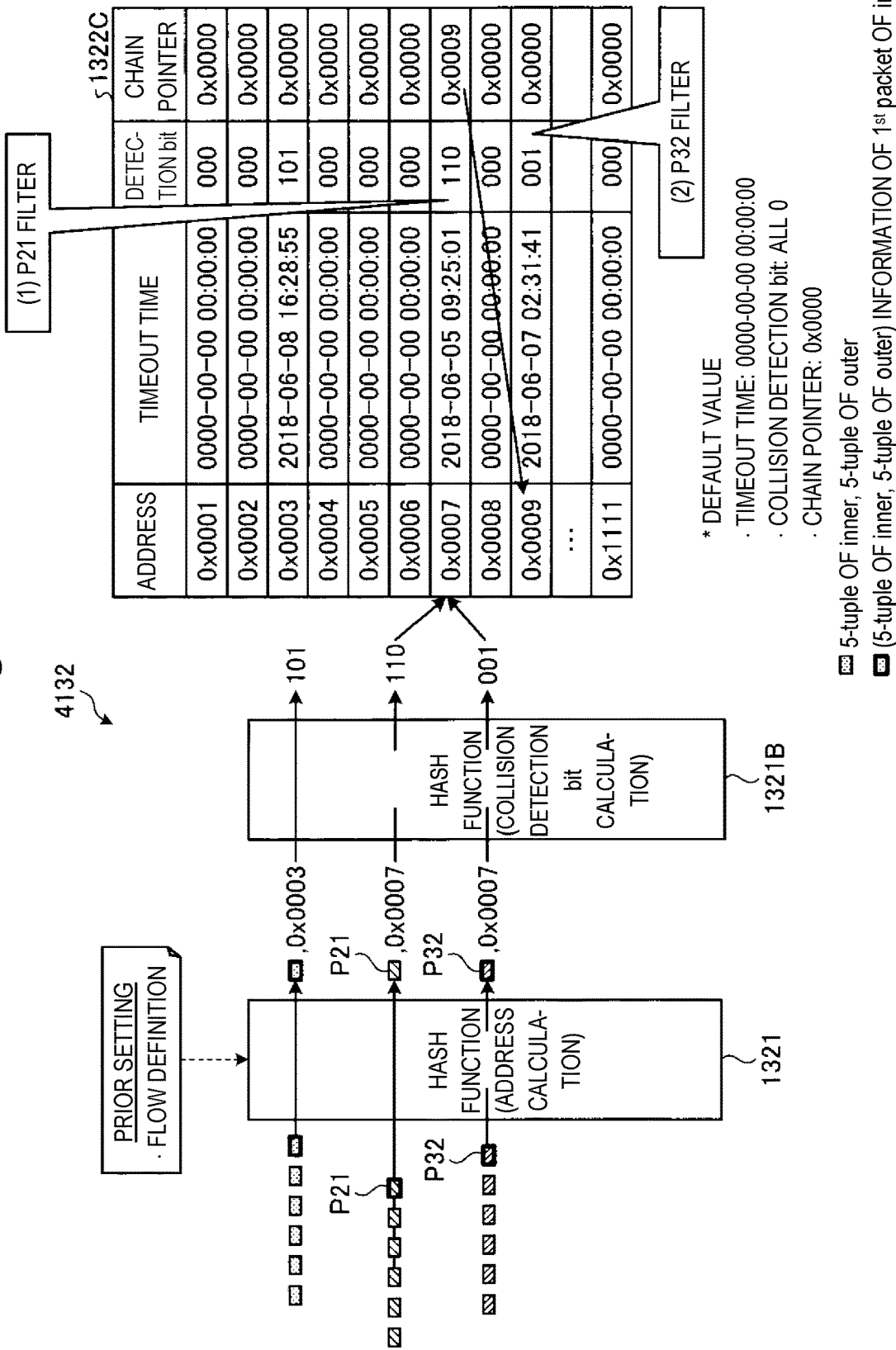
FIG. 35 is a diagram for explaining the flow of the processing of the filter unit shown in FIG. 30.

Processing of the packet P21 is explained with reference to FIG. 35. In this case, the filter unit 4132 accesses the row of the calculated address "0x0007" in the hash table 1322C. Since the timeout time in this row is not the default value and the detection bit "110" and the collision detection bit "110" of the packet P21 calculated using the hash function unit 1321B coincide, the filter unit 4132 filters out the information of the packet P21 (see (1) in FIG. 35).

Subsequently, processing of a packet P32 is explained with reference to FIG. 35. In this case, the filter unit 4132 accesses the row of the calculated address "0x0007" in the hash table 1322C. In this case, the timeout time in this row is not the default value and the detection bit "110" and the collision detection bit "001" of the packet P31 calculated using the hash function unit 1321B do not coincide. Therefore, the filter unit 4132 accesses the row of the address "0x0009" using a value of the chain pointer. Since the timeout time in the row of the address "0x0009" is not the default value and the detection bit "001" and the calculated collision detection bit "001" of the packet P32 coincide, the filter unit 4132 filters out the packet P32 (see (2) in FIG. 35).

Figure 36:
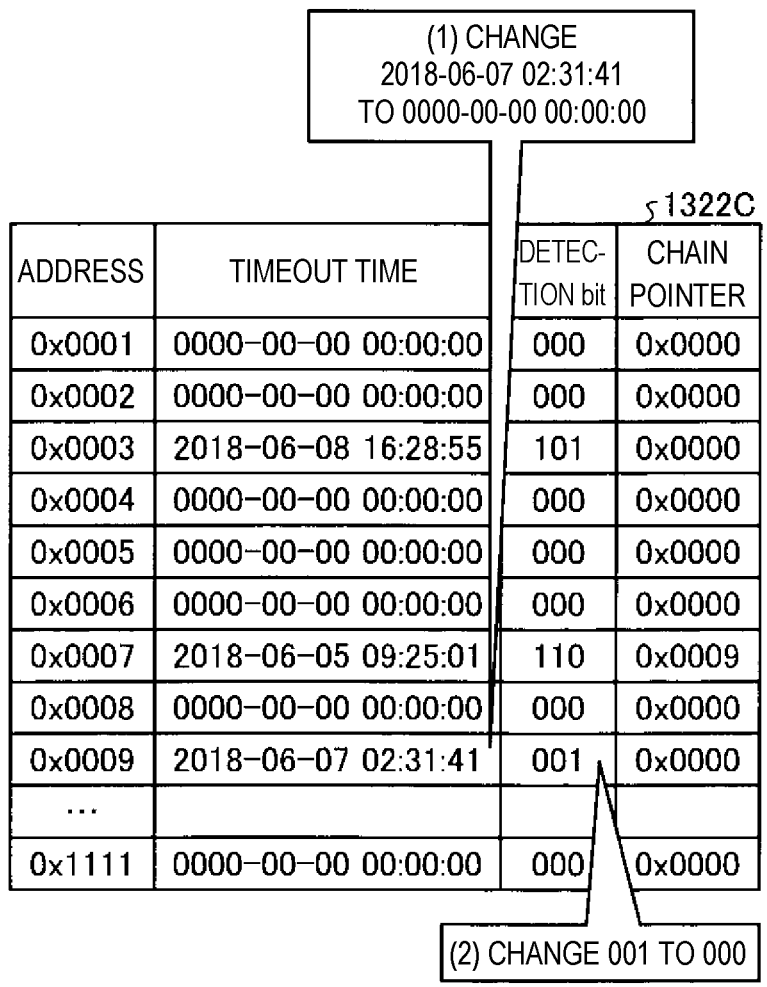
FIG. 36 is a diagram for explaining entry refresh for a hash table shown in FIG. 31.

Subsequently, entry refresh for the hash table 1322C is explained. FIG. 36 is a diagram for explaining the entry refresh for the hash table 1322C shown in FIG. 31.

Specifically, the filter unit 4132 performs refresh of an entry in which present time exceeds the timeout time. For example, a case in which the present time exceeds timeout time "2018-06-07 02:31:41" of the address "0x0009" is explained. In this case, the filter unit 4132 changes the timeout time of this entry from "2018-06-07 02:31:41" to the default value "0000-00-00 00:00:00" (see (1) in FIG. 36) and changes the detection bit from "001" to "000" (see (2) in FIG. 36) to thereby initialize the old entry.

[Processing Procedure of Filter Processing]

Figure 37:
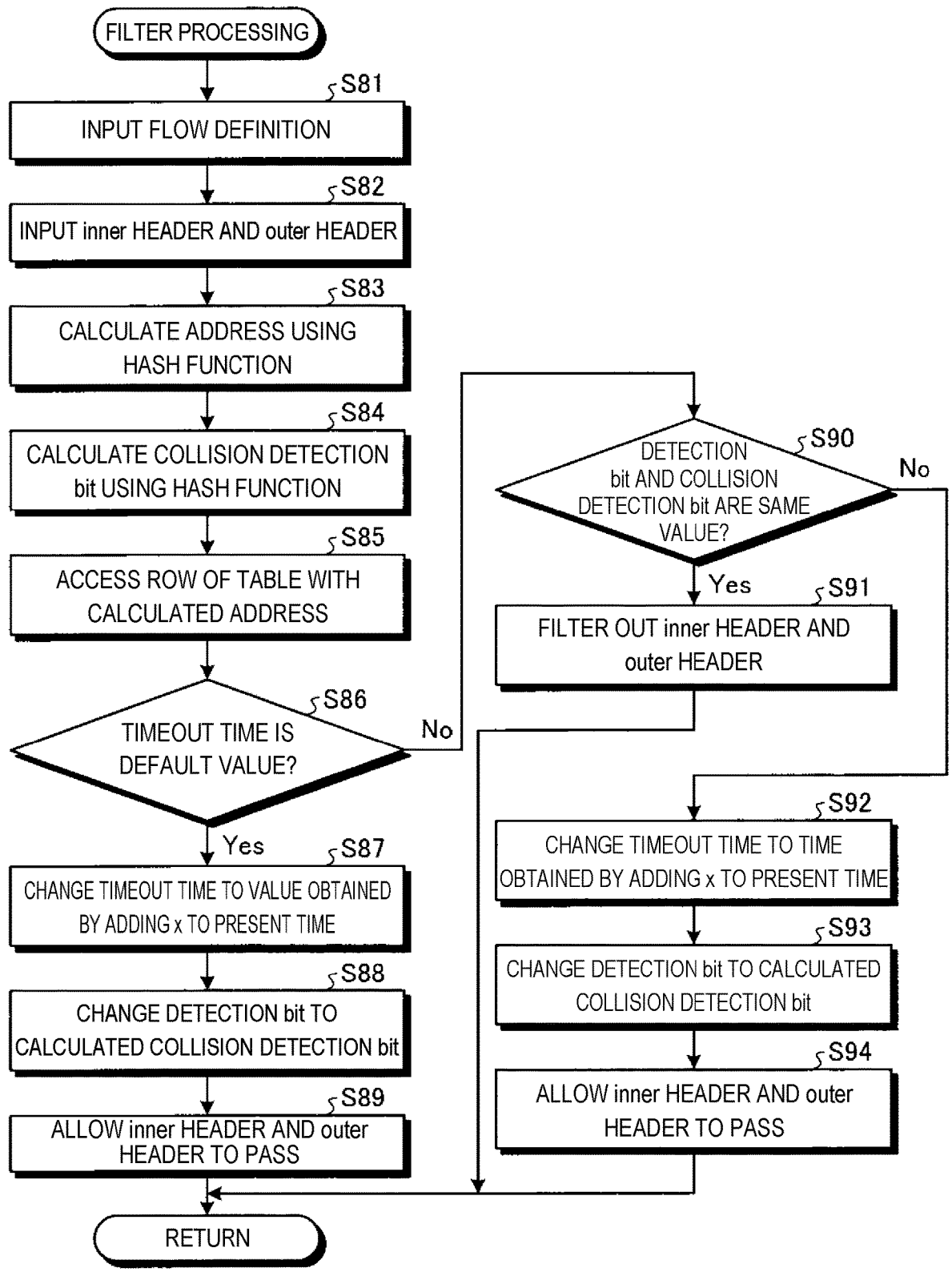
FIG. 37 is a flowchart showing a processing procedure of filter processing according to the fourth embodiment.

The registration device 410 executes the processing shown in FIG. 11 in the order shown in FIG. 11 to thereby perform registration processing. In the registration processing, filter processing is executed in a processing procedure different from the processing procedure shown in FIG. 12. Therefore, the filter processing according to the fourth embodiment is explained with reference to FIG. 37. FIG. 37 is a flowchart showing the processing procedure of the filter processing according to the fourth embodiment.

Step S81 to step S83 shown in FIG. 37 are the same processing as step S11 to step S13 shown in FIG. 12. Step S84 and step S85 shown in FIG. 37 are the same processing as step S54 and step S55 shown in FIG. 28.

When the timeout time is the default value (step S86: Yes), the filter unit 4132 determines that this packet is a first packet of a series of flow and changes the timeout time in the accessed row to time obtained by adding x (sec) to present time (step S87). The filter unit 4132 changes the detection bit in this row to the collision detection bit calculated in step S84 (step S88). The filter unit 4132 allows 5-tuples of an inner header and an outer header of this packet to pass (step S89).

In contrast, when the timeout time is not the default value (step S86: No) and the detection bit in this row and the collision detection bit calculated in step S84 are the same value (step S90: Yes), the filter unit 4132 determines that this packet is a packet of a flow that has already arrived and filters out 5-tuples of an inner header and an outer header of this packet (step S91).

On the other hand, when the detection bit in this row and the collision detection bit are different values (step S90: No), the filter unit 4132 detects collision and registers the address of the processing target packet in another empty entry using the open addressing. The filter unit 4132 changes the timeout time of a row in which the address is registered from the default value to time obtained by adding x (sec) to present time (step S92) and changes the detection bit in this row from the default value to the value of the collision detection bit (step S93). Subsequently, the filter unit 4132 allows 5-tuples of an inner header and an outer header of the processing target packet to pass (step S94).

[Entry Refresh Processing for the Hash Table]

Figure 38:
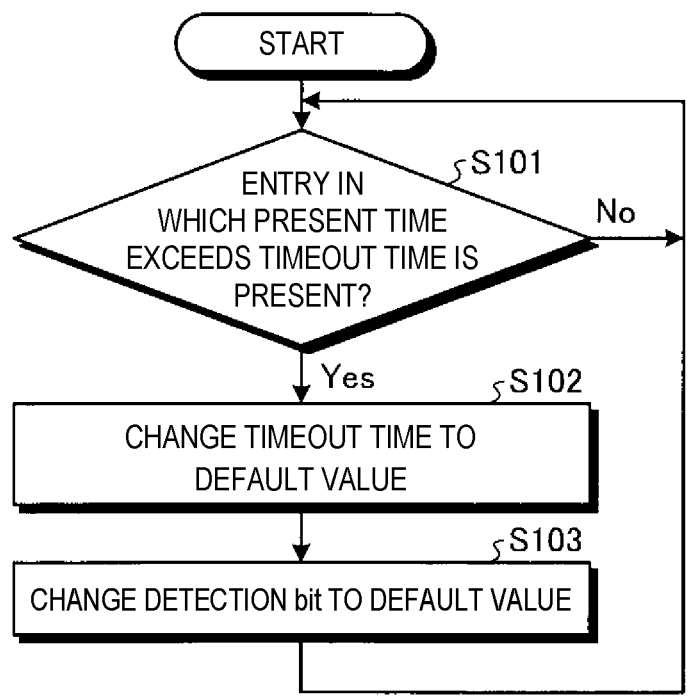
FIG. 38 is a flowchart showing a processing procedure of entry refresh processing for the hash table shown in FIG. 31.

Subsequently, entry refresh processing for the hash table 1322C is explained. FIG. 38 is a flowchart showing a processing procedure of the entry refresh processing for the hash table 1322C shown in FIG. 31.

Step S101 and step S102 shown in FIG. 38 are the same processing as step S41 and step S42 shown in FIG. 20. The filter unit 4132 changes the detection bit to the default value (step S103) and refreshes the entry.

Effects in the Fourth Embodiment

As explained above, the registration device 410 according to the fourth embodiment can detect occurrence of collision as in the fourth embodiment, by calculating the collision detection bit and comparing the collision detection bit with the detection bit registered in the hash table 1322B. Further, the registration device 410 registers, using the open addressing, in another empty entry, a flow in which collision is detected.

As explained above, even when combinations of inner header information and outer header information having different contents are calculated as the same hash value, the registration device 310 registers one combination in an empty entry of the hash table 1322C. As a result, the fourth embodiment makes it possible to prevent registration omission of information and reduce a registration load on the DB 20.

Fifth Embodiment

Figure 39:
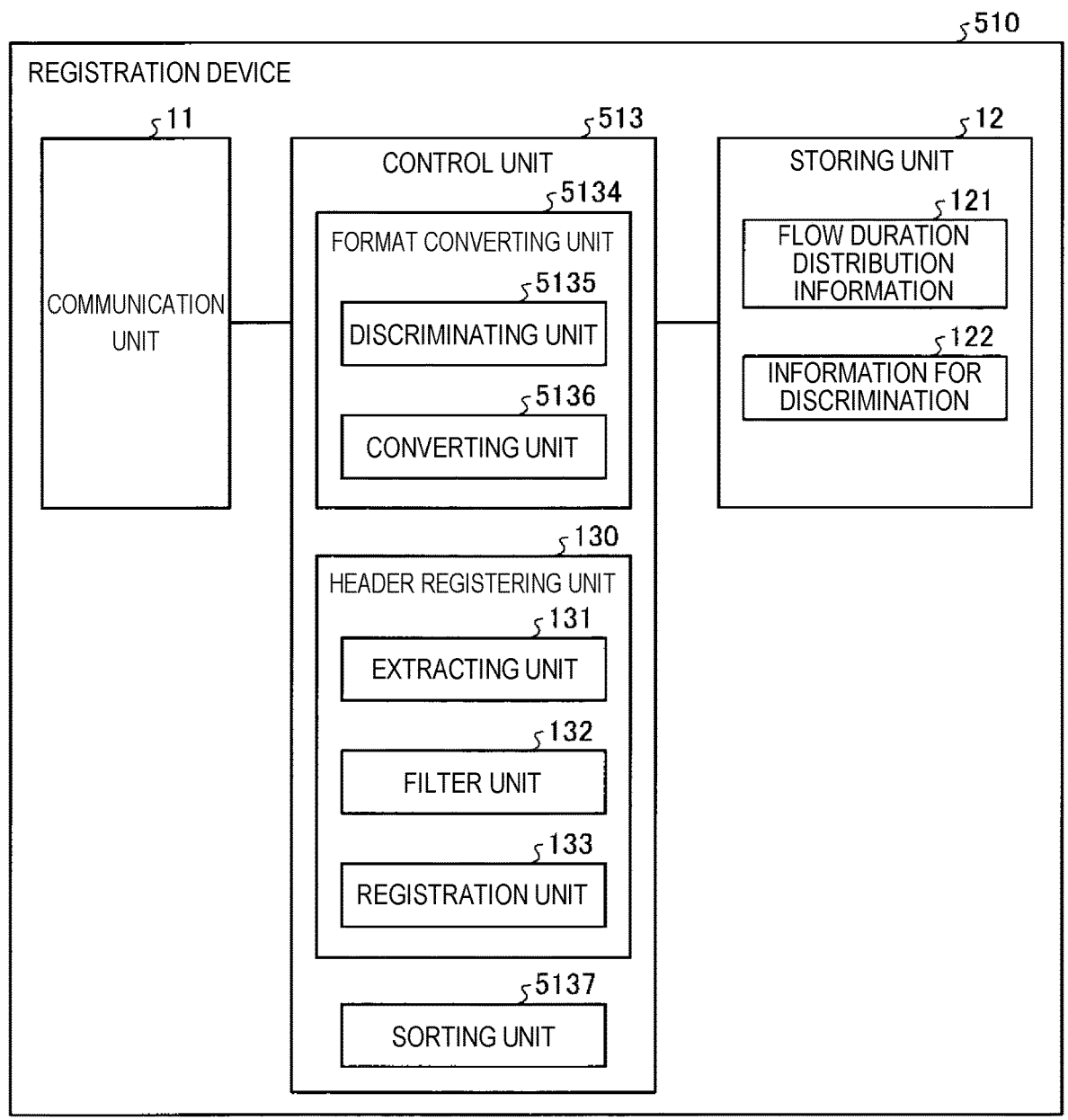
FIG. 39 is a diagram showing an example of the configuration of a registration device according to a fifth embodiment.

Subsequently, a fifth embodiment is explained. In the fifth embodiment, respective functions are deployed in respective cores in a server based on consumed resource amount information of the respective functions. FIG. 39 is a diagram showing an example of the configuration of a registration device according to the fifth embodiment.

As shown in FIG. 39, a registration device 510 according to the fifth embodiment includes a control unit 513 instead of the control unit 13 shown in FIG. 3. The control unit 513 has the same function as the function of the control unit 13. The control unit 513 includes a format converting unit 5134, a header registering unit 130, and a sorting unit 5137.

The format converting unit 5134 converts a tunnel packet input via the network N into an analyzable format irrespective of a format. The format converting unit 5134 converts a packet in which any protocol headers added following an Ether header are stacked in order to perform tunneling into a format in which protocol headers other than an analysis target is excluded. The format converting unit 5134 includes a discriminating unit 5135 and a converting unit 5136.

The discriminating unit 5135 discriminates, according to a discrimination rule created in advance, a protocol stack pattern indicating types and dispositions of respective protocol headers of an input packet. The discrimination rule is created by, for example, another device in advance and set in the discriminating unit 5135 beforehand.

The discrimination rule is a discrimination tree for discriminating a protocol stack pattern created by sequentially searching a packet, a protocol stack pattern of which is known, from a low-order header, a discrimination logical formula for discriminating a protocol stack pattern created based on a specific bit row on the inside of a packet, a protocol stack pattern of which is known, or a protocol config file indicating header information of standardized respective protocols. The discrimination rule is stored in the storing unit 12 as information for discrimination 122.

The discriminating unit 5135 may use a plurality of discrimination rules in combination. For example, about a packet that cannot be discriminated using the discrimination tree or the discrimination logical formula, the discriminating unit 5135 may discriminate a protocol stack pattern using the protocol config file.

The format converting unit 5134 may include a learning unit that creates a discrimination rule. The learning unit learns an input packet using the protocol config file and creates a discrimination rule for discriminating a protocol stack pattern of the packet. The learning unit sequentially searches the packet in order from a low-order header and analyzes a protocol stack pattern using the protocol config file and creates, based on an analysis result, a discrimination tree or a discrimination logical formula for discriminating the protocol stack pattern based on a specific bit row in the packet.

The converting unit 5136 converts, based on the protocol stack pattern discriminated by the discriminating unit 5135, a format of the packet into a format in which protocol headers other than an analysis processing target are excluded. For example, the converting unit 5136 performs packet stripping on a packet in which any protocol headers added following an Ether header are stacked in order to perform tunneling.

The header registering unit 130 registers inner header information and outer header information of a first packet of a series of flow in the DB 20. The header registering unit 130 includes the extracting unit 131, the filter unit 132, and the registering unit 133. The filter unit 132 may be any one of the filter units 2132, 3132, and 4132.

The sorting unit 5137 measures, beforehand, a pps (packets per second) amount causing overprocessing when the respective functions in the registration device 510 are operated on a CPU core, in other words, a pps amount causing a packet loss and sorts, beforehand, deployment of the respective functions in the respective cores based on a value of the measured pps amount.

[Flow of Sorting Processing]

Figure 40:
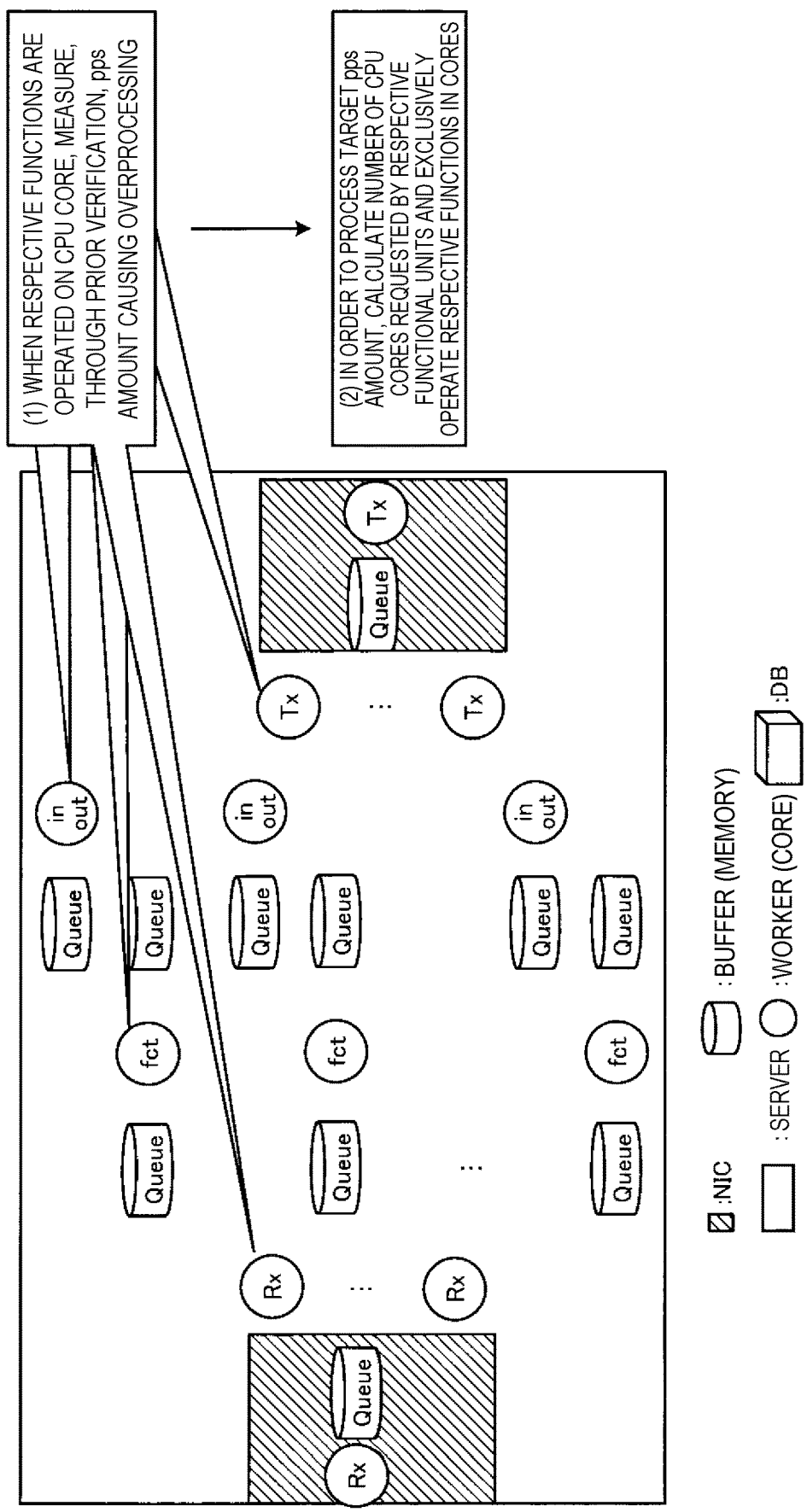
FIG. 40 is a diagram for explaining a flow of sorting processing in the fifth embodiment.

Specifically, a flow of sorting processing of the respective functions to the respective cores by the sorting unit 5137 is explained. FIG. 40 is a diagram for explaining the flow of the sorting processing in the fifth embodiment.

In FIG. 40, a server corresponds to the registration device 510. Among cores shown in FIG. 40, Rx has a packet receiving function, Tx has a packet transmitting function, fct has the format converting function of the format converting unit 5134, fct also has the function of the extracting unit 131 of the header registering unit 130, and in-out has the functions of the filter unit 132 and the registering unit 133 of the header registering unit 130.

The fct or in-out is lower in speed than packet reception (CPU). The packet reception (CPU) is lower in speed than packet reception (NIC). Accordingly, in order to improve a processing amount of an entire system, it is necessary to further perform sorting of a packet in the "packet reception (NIC)" and the "packet reception (CPU)".

Therefore, in order to process a certain target traffic amount in the entire system, function deployment is performed by performing the following procedure. First, when the respective functions are operated on the CPU core, the sorting unit 5137 measures, through prior verification, a pps amount causing overprocessing (see (1) in FIG. 40). In order to process a target pps amount, the sorting unit 5137 calculates the number of CPU cores requested by the respective functional units and disperses the respective functions for each core and operates the respective functions (see (2) in FIG. 40).

For example, a queue of the NIC is short. In order not to cause a packet loss, it is necessary to perform dequeue/enqueue at high speed. Accordingly, the packet reception/the packet transmission are respectively operated in independent cores (for example, a core Rx of the NIC and a core Tx of the NIC). When fct and in-out are operated in the same core, the speed of fct is deteriorated. Therefore, fct and in-out are separated and respectively operated in independent cores. That is, as shown in FIG. 40, the core fct and the core in-out are respectively operated in different cores.

[Processing Procedure of the Sorting Processing]

Figure 41:
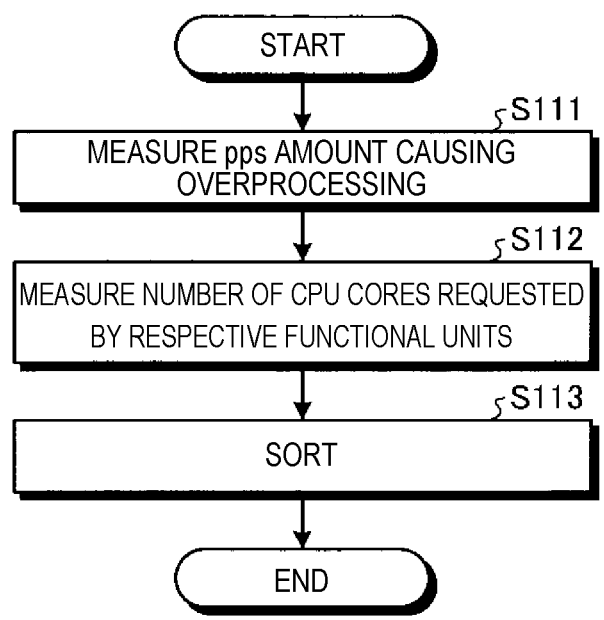
FIG. 41 is a flowchart of a processing procedure of the sorting processing according to the embodiment.

A processing procedure of the sorting processing according to the fifth embodiment is explained. FIG. 41 is a flowchart of the processing procedure of the sorting processing according to the embodiment.

As shown in FIG. 41, the sorting unit 5137 measures, beforehand, a pps amount causing overprocessing when the respective functions in the registration device 510 are operated on the CPU core (step S111). The sorting unit 5137 calculates the numbers of CPU cores requested by the respective functional units (step S112) and sorts, beforehand, deployment of the respective functions to the respective cores based on a value of the measured pps amount (step S113).

[Effects in the Fifth Embodiment]

As explained above, in the fifth embodiment, when the respective functions are operated on the CPU core, the pps amount causing a packet loss is grasped beforehand and the deployment of the respective functions to the respective cores is determined beforehand based on the value of the pps amount. As a result, according to the fifth embodiment, it is possible to determine deployment of a function of processing format conversion and association of inner header information and outer header information without a packet loss for a traffic at a certain target pps in the entire system.

Sixth Embodiment

Figure 42:
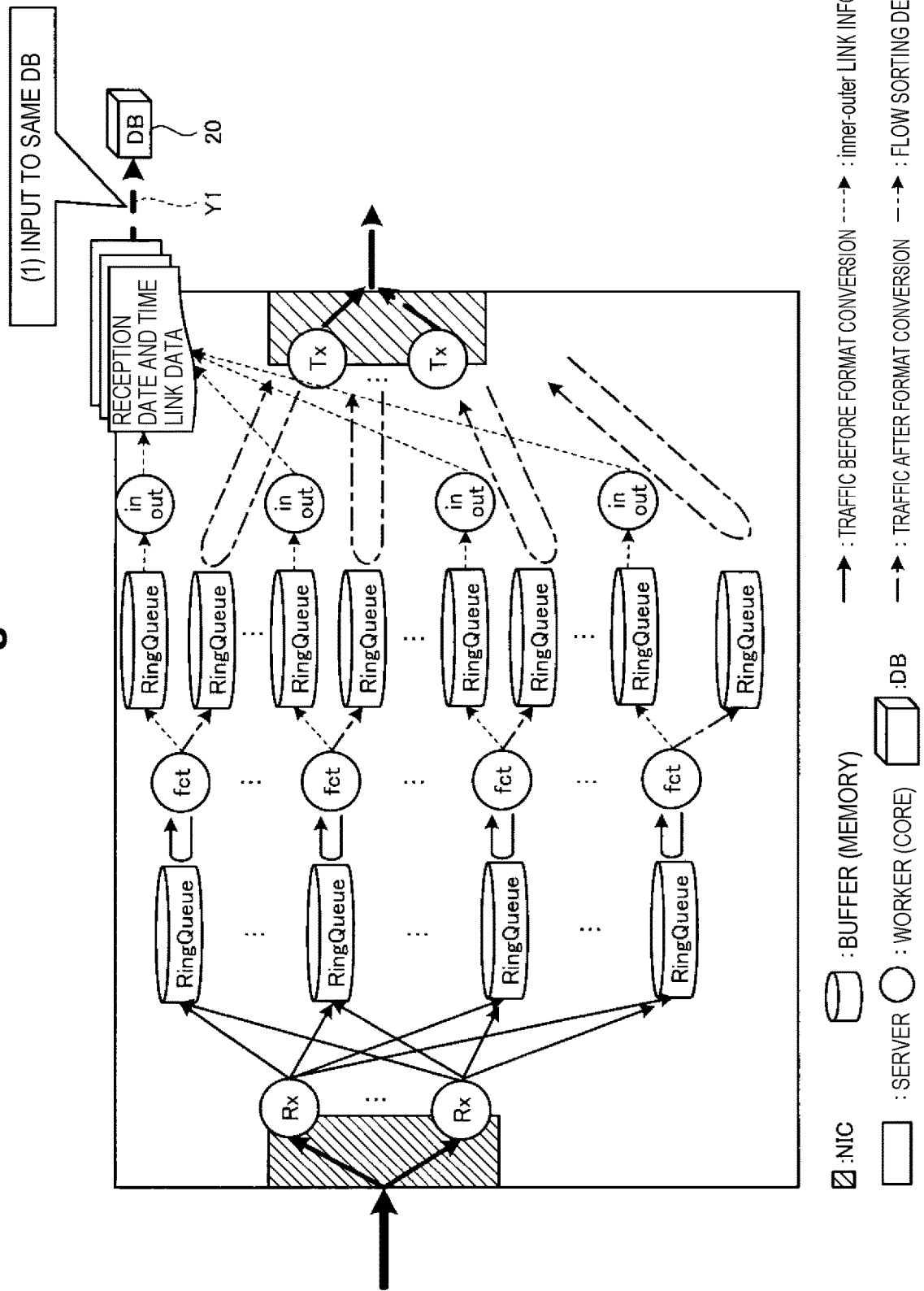
FIG. 42 is a diagram for explaining a flow of an input of information to a DB in a sixth embodiment.

Subsequently, a sixth embodiment is explained. In the sixth embodiment, a registration device intensively collects, from dispersed respective cores, inner header information and outer header information to which time information is given and registers the inner header information and the outer header information in the same DB. FIG. 42 is a diagram for explaining a flow of an input of information to the DB 20 in the sixth embodiment.

As shown in FIG. 42, the registration device (a server) according to the sixth embodiment intensively collects, from dispersed respective cores (cores in-out), association information of inner header information and outer header information of a packet to which time information is given and inputs the association information to the same DB 20 (see (1) in FIG. 42 and an arrow Y1 in FIG. 42).

Effects in the Sixth Embodiment

In a traffic using a tunnel protocol, a combination of inner header information and outer header information changes according to a time change. In contrast, in the sixth embodiment, the association information of the inner header information and the outer header information of the packet to which the time information is given is intensively collected from the dispersed respective cores and input to the same DB 20.

Consequently, in the sixth embodiment, even when a correspondence relation between the inner header information and the outer header information changes according to the elapse of time, the association information can be updated in the DB 20. As a result, according to the sixth embodiment, even when the combination of the inner header information and the outer header information changes, a user can retrieve the latest correspondence relation between the inner header information and the outer header information.

Seventh Embodiment

Subsequently, a seventh embodiment is explained. In the seventh embodiment, a sorting destination of a flow is determined based on a distribution of pps of an input traffic and an amount of use of cores in cooperation with a flow collector.

Figure 43:
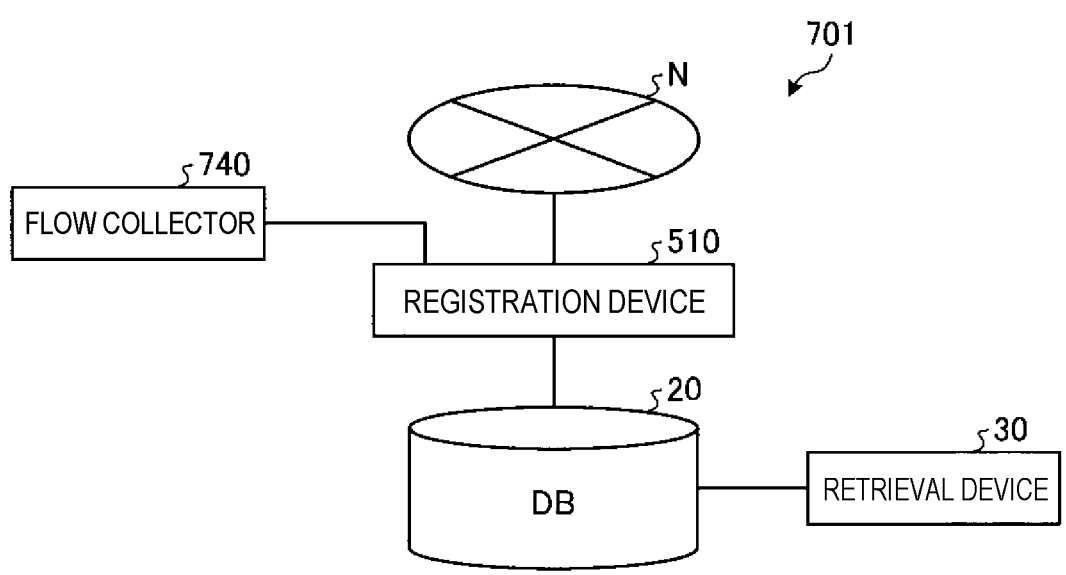
FIG. 43 is a diagram showing an example of the configuration of a communication system according to a seventh embodiment.

FIG. 43 is a diagram showing an example of the configuration of a communication system according to the seventh embodiment. As shown in FIG. 43, compared with the communication system 1 shown in FIG. 1, a communication system 701 according to the seventh embodiment includes a flow collector 740.

The flow collector 740 controls, based on distribution information of pps of an input flow and an amount of use of cores, sorting of the flow to minimize a probability of causing overprocessing of respective cores that perform packet processing.

[Sorting Control Processing]

Figure 44:
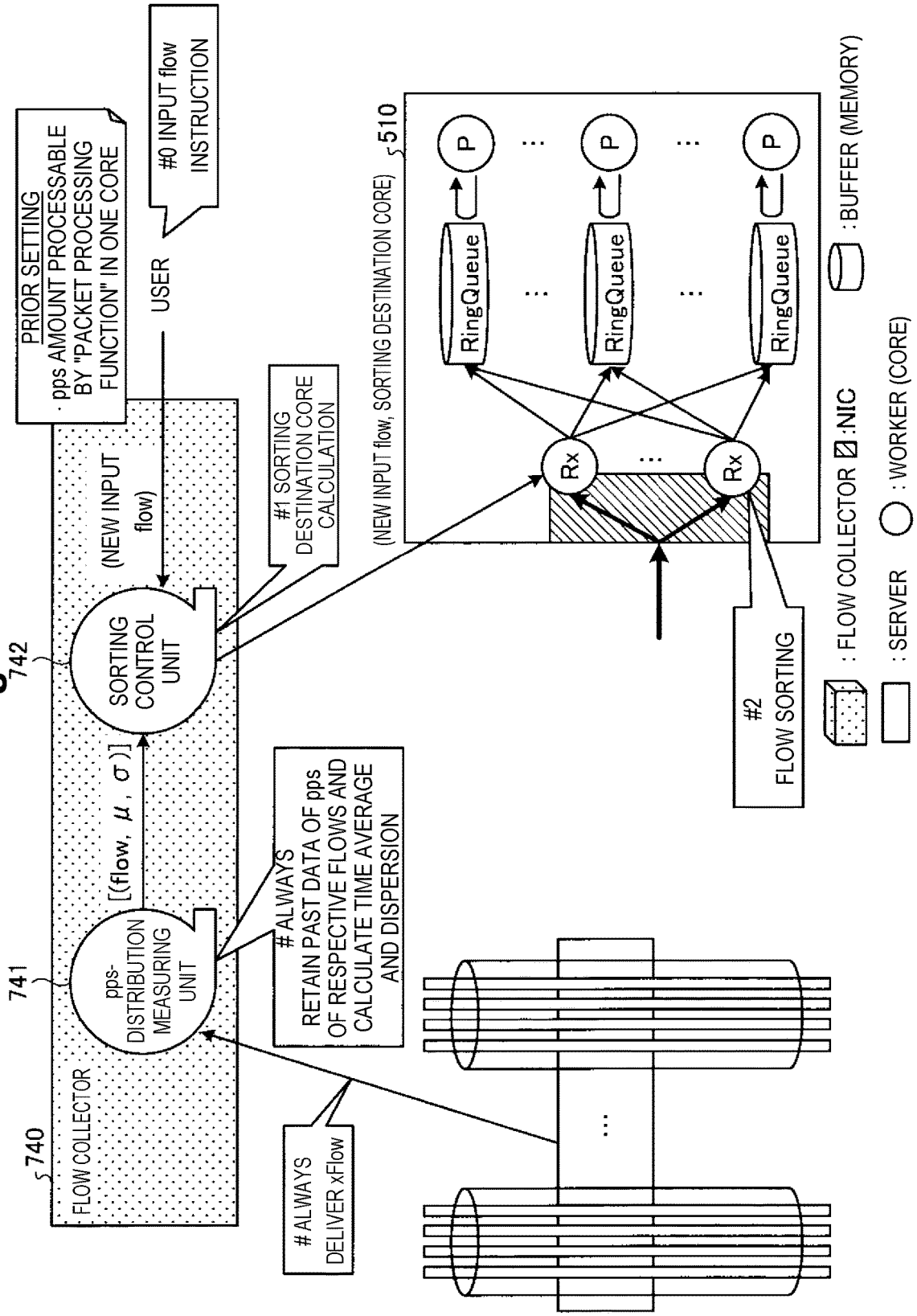
FIG. 44 is a diagram for explaining flow sorting control processing by a flow collector shown in FIG. 43.
Figure 45:
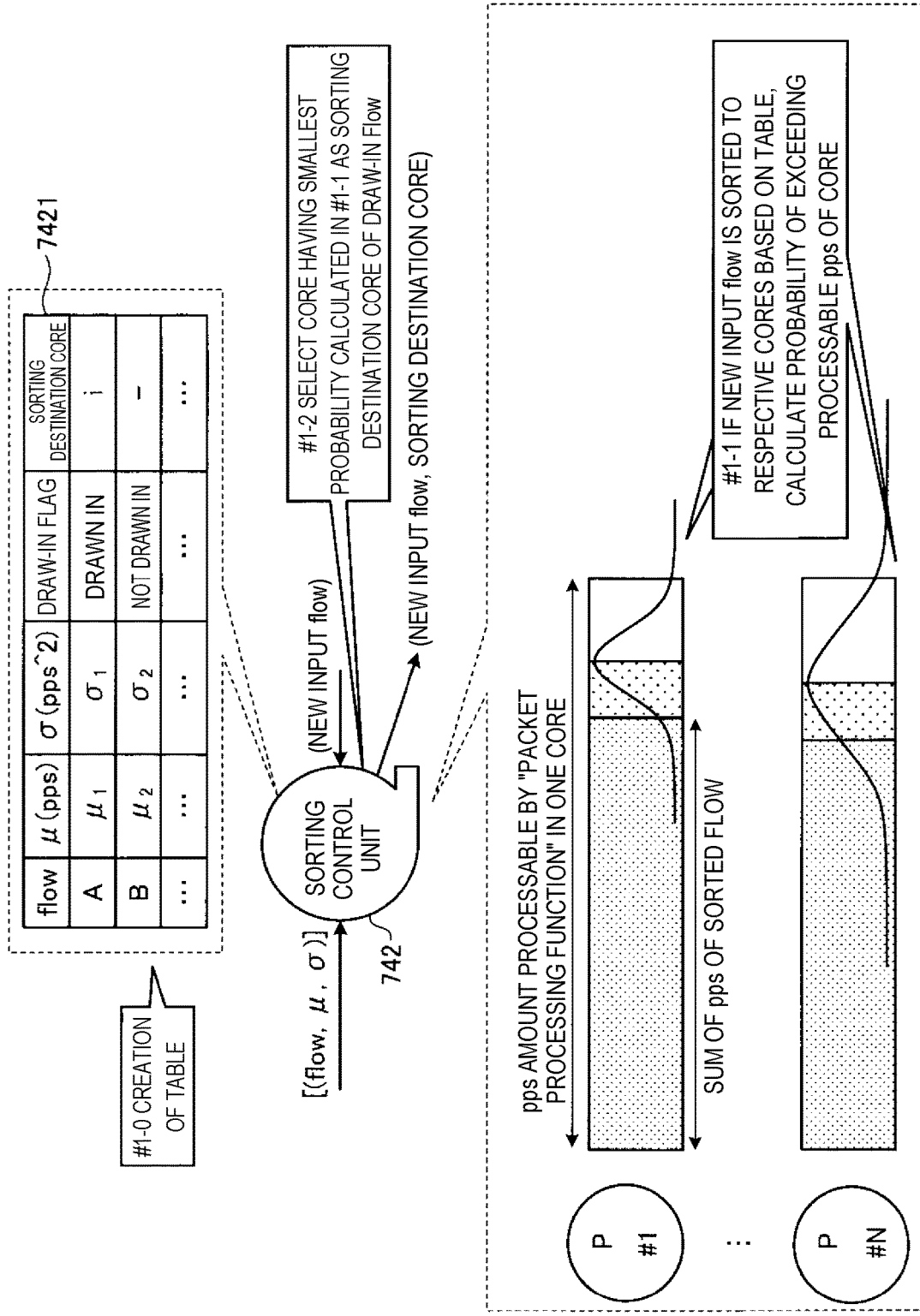
FIG. 45 is a diagram for explaining the flow sorting control processing by the flow collector shown in FIG. 43.

Subsequently, flow sorting control processing by the flow collector 740 is explained with reference to FIG. 44 and FIG. 45. FIG. 44 and FIG. 45 are diagrams for explaining the flow sorting control processing by the flow collector 740 shown in FIG. 43.

As shown in FIG. 44, xFlow is always delivered to a pps-distribution measuring unit 741 of the flow collector 740. The pps-distribution measuring unit 741 calculates distribution information of pps of an input flow. Specifically, the pps-distribution measuring unit 741 retains past data of pps of respective flows and calculates an average time and dispersion (see #always in FIG. 43). In the flow collector 740, distribution information [(flow, $\mu$, $\sigma$)] of the pps of the flow is output to a sorting control unit 742 from the pps-distribution measuring unit 741.

In a tunnel traffic flow input to a system, there is fluctuation in pps depending on time. Therefore, the sorting control unit 742 controls, based on distribution information of pps of an input flow and an amount of use of cores, sorting of the flow to minimize a probability of causing overprocessing of respective cores that perform packet processing. Note that it is implicitly assumed that a large number of flows are included in a tunnel used for convenience of transfer in a carrier NW and addition of pps of respective flows can be approximated to a normal distribution by a central limit theorem.

In the sorting control unit 742, a pps amount processable by a packet processing function in one core is set beforehand. When receiving an instruction for an input flow (flow) from a user (see #0 in FIG. 44), the sorting control unit 742 calculates a sorting destination core (see #1 in FIG. 44). The sorting control unit 742 transmits a new input flow and the sorting destination core to the registration device 510 and instructs sorting of a flow (see #2 in FIG. 44). In the registration device 510, the sorting unit 5137 (not shown) sorts deployment of the respective functions to the respective cores according to sorting control by the flow collector 740.

Subsequently, calculation processing of a sorting destination core by the sorting control unit 742 is explained with reference to FIG. 45. The sorting control unit 742 creates, from the distribution information [(flow, μ, σ)] of pps of the flow, a table 7421 associating μ(pps) and σ(pps^2) for each flow (see #1-0 in FIG. 45). At this time, in the table 7421, the sorting control unit 742 associates indication whether respective flows are already drawn in. In the table 7421, the sorting control unit 742 associates core information of a sorting destination with a flow already drawn in.

Subsequently, when receiving a new input flow, the sorting control unit 742 calculates, based on the table 7421, a probability of exceeding processable pps of a core if the new input flow is sorted to respective cores (see #1-1 in FIG. 45). The sorting control unit 742 selects, as a sorting destination core of the new input flow (a drawn-in flow), a core having the smallest probability calculated in #1-1 (see #1-2 in FIG. 45).

[Processing Procedure of the Sorting Control Processing]

Figure 46:
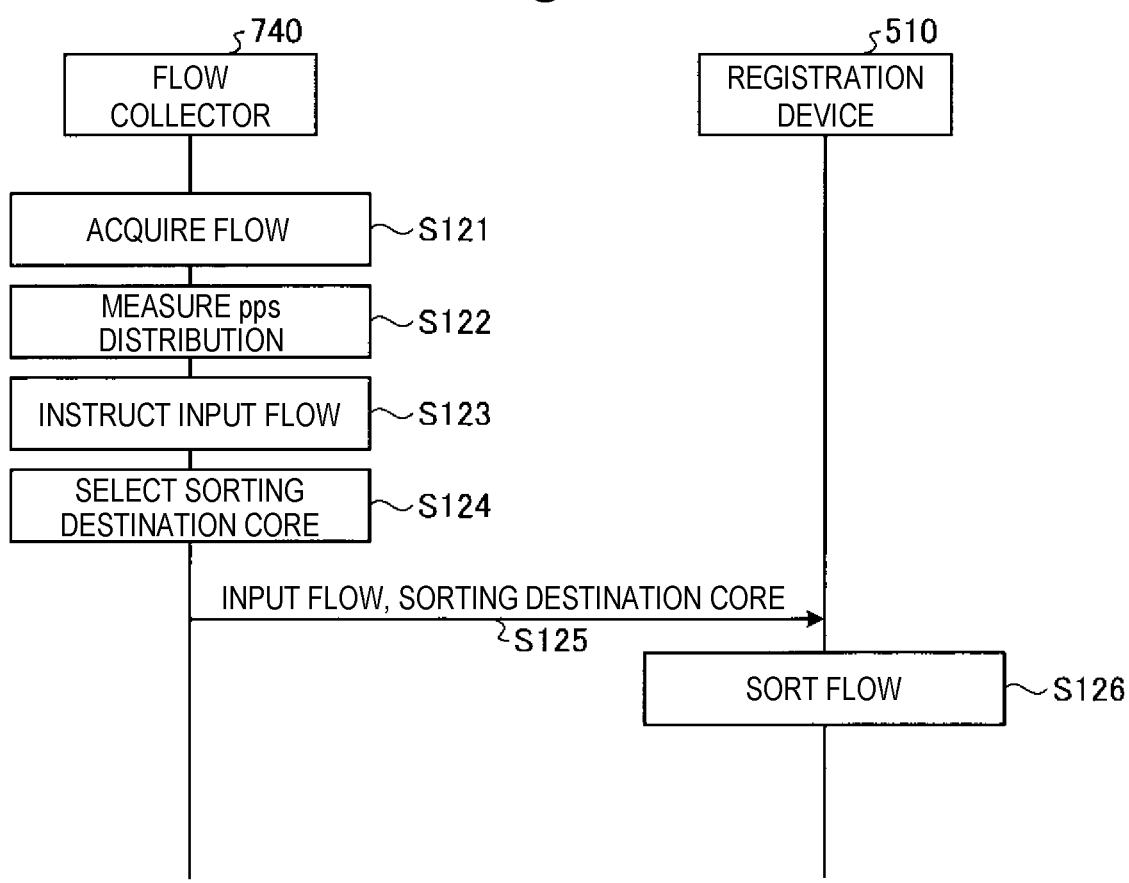
FIG. 46 is a sequence chart showing a processing procedure of sorting control processing to a core in the communication system shown in FIG. 43.

Subsequently, a processing procedure of the sorting control processing to a core in the communication system 701 is explained. FIG. 46 is a sequence chart showing the processing procedure of the sorting control processing to a core in the communication system 701 shown in FIG. 43.

As shown in FIG. 46, when acquiring a delivered tunnel traffic flow (step S121), the flow collector 740 retains past data of pps of respective flows and calculates distribution information of the pps of the flows (step S122).

When receiving an instruction for a new input flow (step S123), the flow collector 740 selects a sorting destination core to minimize a probability of causing overprocessing of respective cores that perform packet processing (step S124). The flow collector 740 transmits information indicating the input flow and the sorting destination core to the registration device 510 as sorting control information (step S125). The registration device 510 sorts a new flow to the selected core according to the sorting control by the flow collector 740 (step S126).

[Effects in the Seventh Embodiment]

As explained above, in the seventh embodiment, by cooperating with the flow collector 740, the sorting of the flow is controlled to minimize the probability of causing overprocessing of the respective cores of the registration device 510, which performs packet processing, while considering fluctuation in a tunnel traffic flow due to a time and a period. Therefore, according to the seventh embodiment, it is possible to prevent concentration of processing in a specific core and reduce a packet loss.

[System Configuration and the Like]

The components of the devices shown in the figures are functionally conceptual components and do not always need to be physically configured as shown in the figures. That is, specific forms of dispersion and integration of the devices are not limited to those shown in the figures. All or a part of the specific forms can be configured to be functionally or physically dispersed or integrated in any unit according to various loads, a state of use, and the like. Further, all or any part of the processing functions performed in the devices can be realized by a CPU and a program analyzed and executed by the CPU or can be realized as hardware by a wired logic.

Among the kinds of processing explained in the embodiments, all or a part of the processing explained as being automatically performed can be manually performed or all or a part of the processing explained as being manually performed can be automatically performed by a publicly-known method. Besides, the information including the processing procedures, the control procedures, the specific names, the various data, and the parameters described in the above document and the drawings can be optionally changed except when specially noted otherwise.

[Program]

Figure 47:
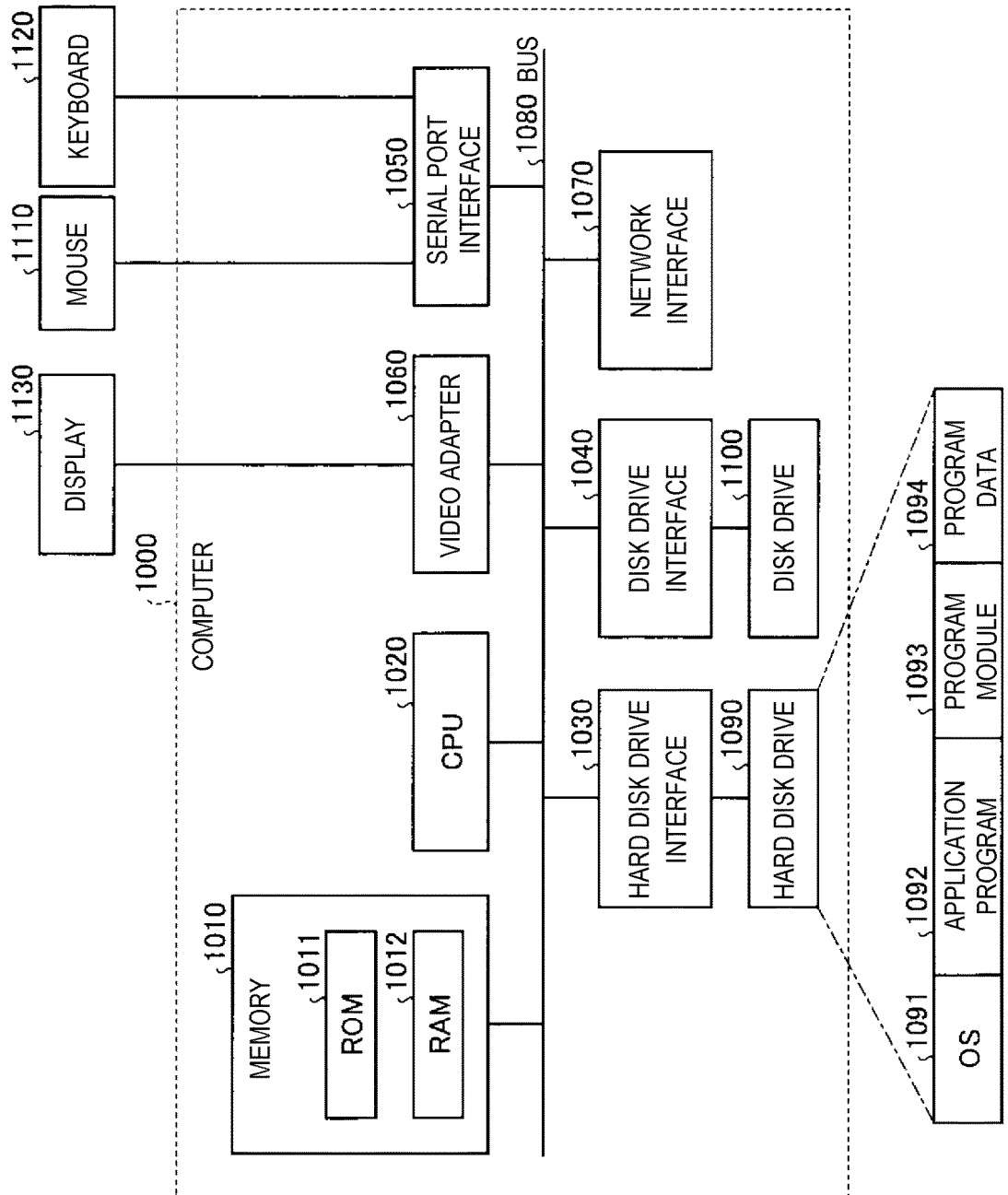
FIG. 47 is a diagram showing an example of a computer in which a registration device is realized by executing a program.

FIG. 47 is a diagram showing an example of a computer in which the registration devices 10, 210, 310, 410, and 510 are realized by executing a program. A computer 1000 includes, for example, a memory 1010 and a CPU 1020. The computer 1000 includes a hard disk drive interface 1030, a disk drive interface 1040, a serial port interface 1050, a video adapter 1060, and a network interface 1070. These units are connected by a bus 1080.

The memory 1010 includes a ROM 1011 and a RAM 1012. The ROM 1011 stores a boot program such as a BIOS (Basic Input Output System). The hard disk drive interface 1030 is connected to a hard disk drive 1090. The disk drive interface 1040 is connected to a disk drive 1100. A removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS (Operating System) 1091, an application program 1092, a program module 1093, and program data 1094. That is, a program specifying the kinds of processing of the registration devices 10, 210, 310, 410, and 510 is implemented as a program module 1093 in which codes executable by a computer are described. The program module 1093 is stored in, for example, the hard disk drive 1090. For example, the program module 1093 for executing the same processing as the functional configurations in the registration devices 10, 210, 310, 410, and 510 is stored in the hard disk drive 1090. Note that the hard disk drive 1090 may be substituted by an SSD (Solid State Drive).

Setting data used in the processing in the embodiments explained above is stored in, for example, the memory 1010 and the hard disk drive 1090 as the program data 1094. The CPU 1020 reads out the program module 1093 and the program data 1094 stored in the memory 1010 and the hard disk drive 1090 to the RAM 1012 according to necessity and executes the program module 1093 and the program data 1094.

Note that the program module 1093 and the program data 1094 are not limited to be stored in the hard disk drive 1090 and may be stored in, for example, a removable storage medium and read out by the CPU 1020 via the disk drive 1100 or the like. Alternatively, the program module 1093 and the program data 1094 may be stored in another computer connected via a network (a LAN, a WAN (Wide Area Network), or the like). The program module 1093 and the program data 1094 may be read out from the other computer by the CPU 1020 via the network interface 1070.

The embodiments to which the invention devised by the present inventor is applied are explained above. However, the present invention is not limited by the descriptions and the drawings forming a part of the disclosure of the present invention according to the embodiments. That is, all of other embodiments, examples, operation techniques, and the like to be devised by those skilled in the art and the like based on the embodiments are included in the category of the present invention.

REFERENCE SIGNS LIST

1, 701 communication system
10, 210, 310, 410, 510 registration device 20 database (DB)
30 retrieval device
11 communication unit
12 storing unit
13, 213, 313, 413, 513 control unit
121 flow duration distribution information
130 header registering unit
131 extracting unit
132, 2132, 3132, 4132 filter unit
133 registering unit
740 flow collector
5134 format converting unit
5135 discriminating unit
5136 converting unit
5137 sorting unit
N network

The invention claimed is:

1. A registration system comprising one or more processors configured to:
   extract inner header information and outer header information of an encapsulated packet;
   calculate a hash value of the inner header information and the outer header information as an address of a hash table;
   calculate, using a hash function, a collision detection value for a processing target packet using the inner header information, the outer header information, and the address of the hash value;
   determine, based on data indicating the calculated hash value in the hash table, whether a first packet of a series of packets that includes the encapsulated packet has previously arrived in an entry of a same address as an address of the processing target packet in the hash table;
   in response to determining, based on the data indicating the calculated hash value in the hash table, that the first packet of the series of packets has not previously arrived in the address of the processing target packet in the hash table:
      set, in the hash table, an address value of the processing target packet as the calculated collision detection value; and
      enable the extracted inner header information and the extracted outer header information of the first packet of the series of packets to pass; and
   register the inner header information and the outer header information of the first packet in a database in association with each other.

2. The registration system according to claim 1, wherein in the hash table, a hash value of the inner header information, the outer header information, and the address in the first packet of the series of packets is registered as a detection value in association with the address, and
   wherein the one or more processors are configured to:
      in response to determining that the first packet of the series of packets has already arrived and when the detection value is different from the collision detection value, to detect a collision.

3. The registration system according to claim 2, wherein, when detecting the collision, the one or more processors are configured to sample the inner header information and the outer header information of the processing target packet and to cause the inner header information and the outer header information to pass or registers, in an empty entry of the hash table, as a detection value, the collision detection value in the processing target packet.

4. The registration system according to claim 1, wherein the one or more processors are configured to measure, beforehand, a pps (packets per second) amount causing a packet loss when respective functions in the registration system are operated on a CPU core and sorts deployment of the respective functions to respective cores beforehand based on a value of the measured pps amount.

5. The registration system according to claim 4, wherein the one or more processors are configured to collect, from dispersed respective cores, inner header information and outer header information to which time information is given and registers the inner header information and the outer header information in a same database.

6. The registration system according to claim 5, wherein the one or more processors are configured to:
   control, based on distribution information of pps of an input flow and an amount of use of cores, sorting of the flow to minimize a probability of causing overprocessing of respective cores that perform packet processing; and
   sort deployment of the respective functions to the respective cores according to the sorting control.

7. A registration method executed by a registration system, comprising:
   extracting inner header information and outer header information of an encapsulated packet;
   calculating a hash value of the inner header information and the outer header information as an address of a hash table;
   calculating, using a hash function, a collision detection value for a processing target packet using the inner header information, the outer header information, and the address of the hash value;
   determining, based on data indicating the calculated hash value in the hash table, whether a first packet of a series of packets that includes the encapsulated packet has previously arrived in an entry of a same address as an address of the processing target packet in the hash table;
   in response to determining, based on the data indicating the calculated hash value in the hash table, that the first packet of the series of packets has not previously arrived in the address of the processing target packet in the hash table:
      setting, in the hash table, an address value of the processing target packet as the calculated collision detection value; and
      enabling the extracted inner header information and the extracted outer header information of the first packet of the series of packets to pass; and
   registering the inner header information and the outer header information of the first packet in a database in association with each other.

8. A non-transitory computer readable medium storing one or more instructions causing a computer to execute:
   extracting inner header information and outer header information of an encapsulated packet;
   calculating a hash value of the inner header information and the outer header information as an address of a hash table;
   calculating, using a hash function, a collision detection value for a processing target packet using the inner header information, the outer header information, and the address of the hash value;
   determining, based on data indicating the calculated hash value in the hash table, whether a first packet of a series of packets that includes the encapsulated packet has previously arrived in an entry of a same address as an address of the processing target packet in the hash table;

in response to determining, based on the data indicating the calculated hash value in the hash table, that the first packet of the series of packets has not previously arrived in the address of the processing target packet in the hash table:

setting, in the hash table, an address value of the processing target packet as the calculated collision detection value; and enabling the extracted inner header information and the extracted outer header information of the first packet of the series of packets to pass; and registering the inner header information and the outer header information of the first packet in a database in association with each other.

9. The registration method of claim 7, further comprising:

registering a hash value of the inner header information, the outer header information, and the address in the first packet of the series of packets in the hash table in association with the address; and in response to determining that the first packet of the series of packets has already arrived and when the detection value is different from the collision detection value, detecting collision.

10. The registration method of claim 9, wherein:

sampling, when detecting the collision, the inner header information and the outer header information of the processing target packet and causes the inner header information and the outer header information to pass or registers, in an empty entry of the hash table, as a detection value, the collision detection value in the processing target packet.

11. The registration method of claim 7, further comprising:

measuring, beforehand, a pps (packets per second) amount causing a packet loss when respective functions in the registration system are operated on a CPU core and sorts deployment of the respective functions to respective cores beforehand based on a value of the measured pps amount.

12. The registration method of claim 11, further comprising:

collecting, from dispersed respective cores, inner header information and outer header information to which time information is given and registers the inner header information and the outer header information in a same database.

13. The registration method of claim 12, further comprising:

controlling, based on distribution information of pps of an input flow and an amount of use of cores, sorting of the packets to minimize a probability of causing overprocessing of respective cores that perform packet processing; and sorting deployment of the respective functions to the respective cores according to the sorting control.

14. The non-transitory computer readable medium according to claim 8, further comprising:

registering a hash value of the inner header information, the outer header information, and the address in the first packet of the series of packets in the hash table in association with the address; and in response to determining that the first packet of the series of packets has already arrived and when the detection value is different from the collision detection value, detecting collision.

15. The non-transitory computer readable medium according to claim 14, further comprising:

sampling, when detecting the collision, the inner header information and the outer header information of the processing target packet and causes the inner header information and the outer header information to pass or registers, in an empty entry of the hash table, as a detection value, the collision detection value in the processing target packet.

16. The non-transitory computer readable medium according to claim 8, further comprising:

measuring, beforehand, a pps (packets per second) amount causing a packet loss when respective functions in a registration system are operated on a CPU core and sorts deployment of the respective functions to respective cores beforehand based on a value of the measured pps amount.

17. The non-transitory computer readable medium according to claim 16, further comprising:

collecting, from dispersed respective cores, inner header information and outer header information to which time information is given and registers the inner header information and the outer header information in a same database.

18. The non-transitory computer readable medium according to claim 17, further comprising:

controlling, based on distribution information of pps of an input flow and an amount of use of cores, sorting of the packets to minimize a probability of causing overprocessing of respective cores that perform packet processing; and sorting deployment of the respective functions to the respective cores according to the sorting control.

* * * * *